US012746834B1

(12) United States Patent
Su et al.

(10) Patent No.: US 12,746,834 B1
(45) Date of Patent: Sep. 29, 2026

(54) WIRELESS POWER TRANSFER SYSTEMS

(71) Applicant: UT-Battelle, LLC, Oak Ridge, TN (US)

(72) Inventors: Gui-Jia Su, Knoxville, TN (US); Vandana Rallabandi, Knoxville, TN (US); Mostak Mohammad, Knoxville, TN (US); Md S. Chowdhury, Knoxville, TN (US); Omer C. Onar, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 19/545,097

(22) Filed: Feb. 20, 2026

(51) Int. Cl.

| | |
|---|---|
| ***H02J 50/12*** | (2016.01) |
| ***B60L 53/122*** | (2019.01) |
| ***B60L 53/30*** | (2019.01) |
| ***H02J 50/00*** | (2016.01) |
| ***H02J 50/40*** | (2016.01) |

(52) U.S. Cl.
CPC ............. *B60L 53/122* (2019.02); *B60L 53/30* (2019.02); *H02J 50/005* (2020.01); *H02J 50/12* (2016.02); *H02J 50/402* (2020.01)

(58) Field of Classification Search
CPC ...... B60L 53/122; B60L 53/30; H02J 50/005; H02J 50/12; H02J 50/402
See application file for complete search history.

(56) References Cited

U.S. PATENT DOCUMENTS

2019/0089197 A1* 3/2019 Mao ........................ H02J 50/70
2024/0006934 A1* 1/2024 Podhola ................. H02K 41/02

FOREIGN PATENT DOCUMENTS

WO 2020142621 A2 7/2020

OTHER PUBLICATIONS

Oringial Document and English Translation of NPL _DE_ 102013004180_A—Title: Primary coil arrangement for inductive energy transmission with quadrupoles (Year: 2014).*
J. Pries, V. P. Galigekere, O. C. Onar, and G.-J. Su, "A 50-KW Three-Phase Wireless Power Transfer System Using Bipolar Windings and Series Resonant Networks for Rotating Magnetic Fields," IEEE Transactions on Power Electronics, vol. 35, No. 5, pp. 4500-4517, 2020.

(Continued)

*Primary Examiner* — Rexford N Barnie
*Assistant Examiner* — Terrence R Willoughby
(74) *Attorney, Agent, or Firm* — FOX ROTHSCHILD LLP

(57) ABSTRACT

System and methods for providing a magnetic field. The methods comprise: supplying AC power to a four-phase coil assembly operable in a plurality of different operational modes; creating a rotating magnetic field by the four-phase coil assembly when operating in a first mode of the plurality of different operational modes; and creating a non-rotating magnetic field by the four-phase coil assembly when operating in a second mode of the plurality of different operational modes. The four-phase coil assembly comprise at least one first layer of four coils disposed on a magnetic core so as to be arranged symmetrically around a center of the four-phase coil assembly. Each of the four coils is associated with a respective one of four phases.

20 Claims, 31 Drawing Sheets

(56) References Cited

OTHER PUBLICATIONS

M. Mohammad, J. L. Pries, O. C. Onar, V. P. Galigekere, G.-J. Su, and J. Wilkins, "Three-phase LCC-LCC compensated 50-KW wireless charging system with non-zero interphase coupling," in Proc., IEEE Applied Power Electronics Conference and Exposition (APEC), pp. 456-462, Jun. 2021, Phoenix, AZ.

O. C. Onar et al., "A 100-KW Wireless Power Transfer System Development Using Polyphase Electromagnetic Couplers," in 2022 IEEE Transportation Electrification Conference & Expo (ITEC), Anaheim, CA, Jun. 2022, pp. 273-278.

D. J. Thrimawithana and U. K. Madawala, "A three-phase bi-directional IPT system for contactless charging of electric vehicles," 2011 IEEE International Symposium on Industrial Electronics, Gdansk, Poland, 2011, pp. 1957-1962.

S. Kim, G. A. Covic, and J. T. Boys, "Comparison of tripolar and circular pads for IPT charging systems," IEEE Transactions on Power Electronics, vol. 33, No. 7, pp. 6093-6103, Jul. 2018.

J. M. Miller, A. W. Daga, F. J. McMahon, P. C. Schrafel, B. Cohen and A. W. Calabro, "A Closely Coupled and Scalable High-Power Modular Inductive Charging System for Vehicles," in IEEE Journal of Emerging and Selected Topics in Power Electronics, vol. 10, No. 3, pp. 3259-3272, Jun. 2022.

V. P. Galigekere et al., "Design and Implementation of an Optimized 100 KW Stationary Wireless Charging System for EV Battery Recharging," 2018 IEEE Energy Conversion Congress and Exposition (ECCE), Portland, OR, USA, 2018, pp. 3587-3592.

* cited by examiner (Unipolar)

(Unipolar)

(Unipolar)

(Unipolar)

(DD@θ mode for rotational misalignment.
In this case, the flux generated by coils B and
D aligns better with the DD coil.)

(Unipolar)

800

(Power transfer from unipolar 4-phase to unipolar 4-phase)

(Power transfer from unipolar four-phase non-circular coil operating in 4single-phase DD or circular mode to a single-phase DD or circular coil)

(Power transfer from single-phase DD or circular coil to a unipolar four-phase non-circular coil operating in a DD or circular mode)

(Unipolar)

(Unipolar)

(Bipolar)

(4-phase mode with a 90° phase shift between each adjacent coil pair A/B, B/C, C/D, D/A)

(Bipolar)

(Single Phase Circular Mode)

1600

(Bipolar 4-phase and Bipolar 4-phase)

1700

(Bipolar 4-phase and Bipolar 4-phase)

1800

(Power transfer from bipolar 4-phase to single-phase DD or Circular)

(Power transfer from single-phase DD or circular to bipolar 4-phase)

WIRELESS POWER TRANSFER SYSTEMS

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

BACKGROUND

Description of the Related Art

Wireless power transfer (WPT) systems are safe and convenient methods for charging electric vehicle (EV) batteries. The power density of WPT systems has been increasing by using different coil and core geometries. Using magnetic core materials significantly decreases the reluctance of the magnetic flux path and helps increase magnetic coupling. However, core materials increase the weight and cost of a WPT system.

SUMMARY

The present disclosure concerns implementing systems and methods for providing a magnetic field and/or wireless power transfer. The methods comprise: supplying AC power to a four-phase coil assembly operable in a plurality of different operational modes; creating a rotating magnetic field by the four-phase coil assembly when operating in a first mode of the plurality of different operational modes; and creating a non-rotating magnetic field by the four-phase coil assembly when operating in a second mode of the plurality of different operational modes. The four-phase coil assembly comprises at least one first layer of four coils disposed on a magnetic core so as to be arranged symmetrically or asymmetrically around a center of the four-phase coil assembly. Each of the four coils is associated with a respective one of four phases.

The present disclosure also concerns a system comprising: a power source configured to supply alternating current; and a four-phase coil assembly having a shape and comprising at least one first layer of four coils disposed on a magnetic core so as to be arranged symmetrically or asymmetrically around a center of the four-phase coil assembly. Each of the four coils is associated with a respective one of four phases. The four-phase coil assembly is configured to be operable in a plurality of different operational modes. A rotating magnetic field is created by the four-phase coil assembly when the alternating current is supplied thereto from the power source and the four-phase coil assembly is operating in a first mode of the plurality of different operational modes. A non-rotating magnetic field is created by the four-phase coil assembly when the alternating current is supplied thereto from the power source and the four-phase coil assembly is operating in a second mode of the plurality of different operational modes.

BRIEF DESCRIPTION OF THE DRAWINGS

The present solution will be described with reference to the following drawing figures, in which like numerals represent like items throughout the figures.

FIGS. 3A-3B are collectively referred to as "FIG. 3".

FIGS. 6A-6B may be collectively referred to as "FIG. 6".

FIGS. 13A-13B may be collectively referred to as "FIG. 13".

DETAILED DESCRIPTION

Figure 1:
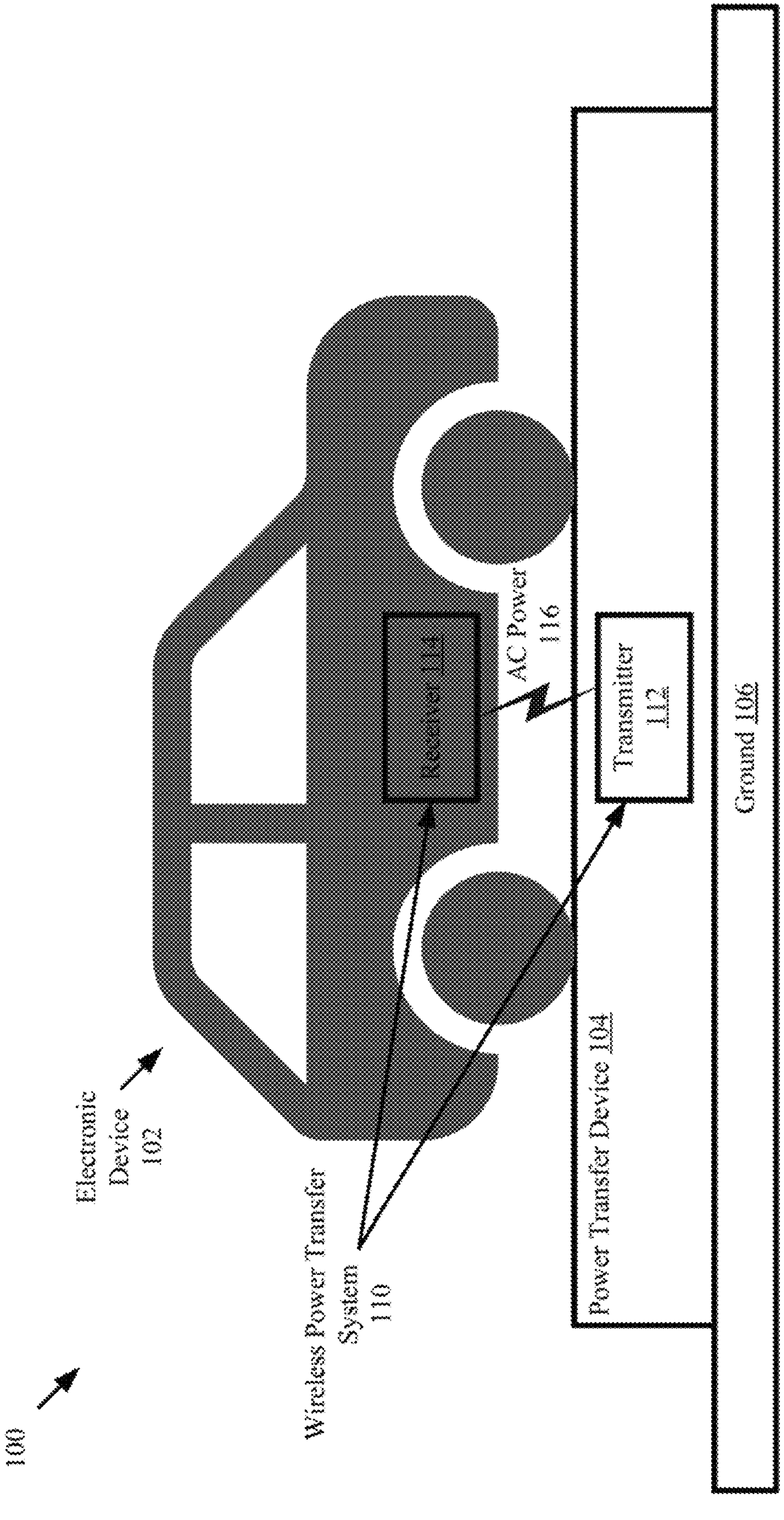
FIG. 1 provides an illustration of a system implementing the present solution.

The term "polyphase" used herein refers to the transmitter and/or receiver in a wireless power transfer system having more than one phase. A polyphase system may rotate the field to transfer power. Conventional polyphase systems are discussed in International PCT Publication Number WO2020/142621 to Pries et al. The content of this International PCT Application is incorporated by reference in its entirety. The present solution concerns a novel polyphase system operable in multiple modes such that it may selectively and/or dynamically be controlled to create a rotating magnetic field and a non-rotating magnetic field.

The number of electric vehicles (EVs) in use is increasing, but long charging durations and limited driving range are still significant problems for broad EV adoption. Using wireless charging technology in parking lots, at bus stops, and on roads remains the most likely solution to extend driving range and decrease charging durations for EVs.

The present solution provides an FPWPT system for high-power charging applications that may be used with EVs. The different application areas for the present solution include, but are not limited to, WPT system applications, electric machine applications, transformer design applications, inductor core design applications, and/or shielding design applications. The FPWPT system achieves increased mutual coupling, reduced coil current, reduced eddy current losses, and improved space utilization by fully occupying square or rectangular areas, in contrast to conventional circular three-phase WPT systems. The FPWPT system also exhibits good interoperability with existing single-phase circular and double-D (DD) coils. The FPWPT system mitigates magnetic flux crowding and reduces ripple currents at both the input and output direct current (DC) terminals. The FPWPT system is modeled and simulated using finite element analysis (FEA) and circuit-level tools. The results demonstrate that the FPWPT system achieves low stray magnetic fields and lowers the required DC bus filter capacitance on both transmitter (inverter input) and receiver (rectifier output) sides.

Three-phase wireless power transfer (TPWPT) systems have emerged as one solution for high-power electric vehicle charging applications due to their high surface power density, improved efficiency, reduced magnetic flux concentration, and lower electromagnetic field emissions compared to single-phase counterparts. However, conventional balanced THWPT systems typically employ circular or hexagonal coil layouts, whereas the available space beneath most vehicles is rectangular. Consequently, circular three-phase coil arrangements cannot fully utilize the allotted installation area. A FPWPT topology can overcome these geometric limitations while retaining the key advantages of balanced multi-phase WPT systems.

To address the geometric limitation of circular multi-phase designs, the proposed FPWPT system employs four phase coils that better utilize the available under-vehicle area. This configuration enhances magnetic coupling while reducing phase current and flux concentration. The improved field distribution also leads to lower ripple in the input and output currents and contributes to compact, efficient packaging suitable for high-power charging applications.

Rectangular or modular coil arrangements have been explored in single-phase and DD systems to enhance interoperability, but they do not fully exploit the advantages of multi-phase operation. The FPWPT configuration is introduced to bridge this gap. The electromagnetic design, modeling, and circuit-level simulation of the proposed FPWPT system will be discussed below. Performance of the FPWPT system is evaluated in terms of coupling efficiency, field uniformity, and DC-side ripple characteristics.

FIG. 1 provides an illustration of a system 100 implementing the FPWPT system of the present solution. System 100 comprises an electronic device 102 positioned on a power transfer device 104. Electronic device 102 can include, but is not limited to, a vehicle. Power transfer device 104 may include, but is not limited to, a pad disposed on the ground 106 or other supporting structure that the electronic device 102 can be positioned over, on top of or otherwise in proximity thereto. The power transfer device 104 comprises a transmitter 112 of a wireless power transfer system 110, while the electronic device 102 comprises a receiver 114 of the wireless power transfer system 110. Alternating current (AC) power 116 may be transferred from the power transfer device 104 to the electronic device 102 via the wireless power transfer system 110.

Figure 2:
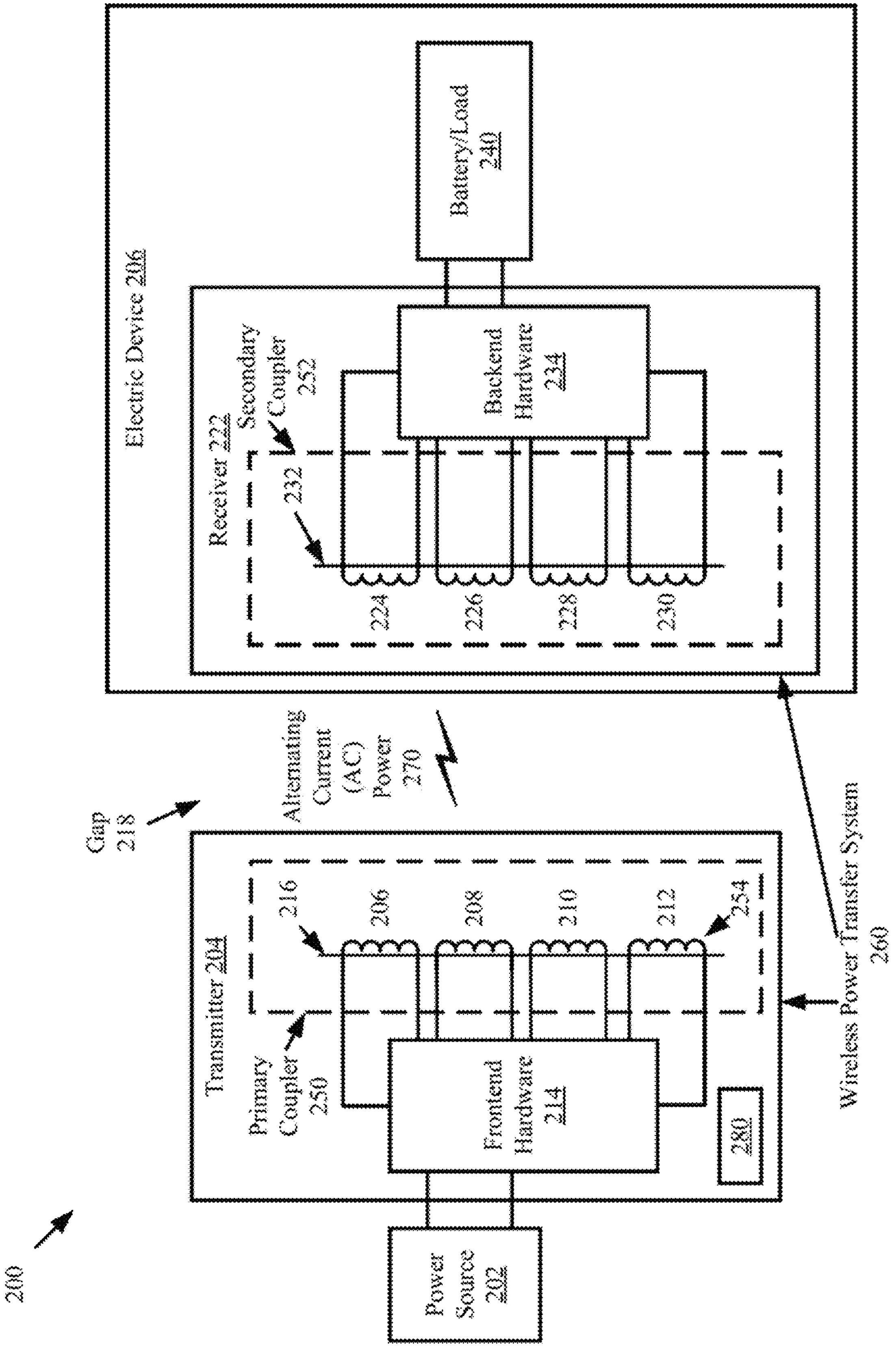
FIG. 2 provides an illustration of another system implementing the present solution.

FIG. 2 provides a more detailed block diagram that is useful for understanding the FPWPT system of the present solution. FPWPT system may be implemented in system 100 of FIG. 1. In this scenario, electronic device 102 may be the same as or similar to electronic device 206 of FIG. 2. Wireless power transfer system 110 of FIG. 1 may be the same as or similar to wireless power transfer system 260 of FIG. 2. Transmitter 112 of FIG. 1 may be the same as or similar to transmitter 204 of FIG. 2. Receiver 114 of FIG. 1 may be the same as or similar to receiver 222 of FIG. 2.

As shown in FIG. 2, system 200 comprises a power source 202 connected to transmitter 204. Transmitter 204 is spaced apart from the electronic device 206 such that a gap 218 is provided therebetween. Electronic device 206 can include, but is not limited to, an electric vehicle, a hybrid vehicle, or other electronic device with an internal battery that may be recharged.

During operation, power source 202 provides input power to transmitter 204. Power source 202 can include, but is not limited to, the electrical grid or other alternating current (AC) power source. The input power can include, but is not limited to, 120 VAC at 60 Hz, 400 VAC at 50 Hz, or 480 VAC at 60 Hz. The present solution is not limited to AC input power. In some scenarios, power source 202 comprises a direct current (DC) power source such as a high voltage battery. For example, an electric vehicle battery may be used to charge another electric vehicle battery.

Transmitter 204 comprises frontend hardware 214 and a primary power coupler 250. Frontend hardware 214 can include, but is not limited to, a power factor correction (PFC) converter, a DC-to-DC converter, a polyphase inverter, a compensation network, and/or other electronic devices. Each of the listed devices is well known. Still, it should be noted that the PFC converter comprises an electronic circuit configured to convert the AC input voltage to a DC voltage and the DC-to-DC converter comprises an electronic circuit configured to convert the DC input voltage to a DC bus voltage (e.g., 200V, 1000V, etc.). The polyphase inverter comprises an electronic circuit or device configured to convert the DC voltage into a polyphase alternating current. The electronic circuit of the polyphase inverter can include, but is not limited to, a plurality of switching pairs. The number of switching pairs may be dependent on the number of phases in coil assembly 254 and polarity of the coils. Each switch of the switching pairs can include, but is not limited to, a field effect transistor (FET), a metal-oxide-semiconductor FET (MOSFET), or other switching element. Controller 280 may act as a gate driver to turn ON and OFF each switching element of the switching pairs. The compensation network comprises an electronic circuit configured to compensate for poor stability or impedance mismatches. In this regard, the compensation network may be tuned to achieve at least two independently excitable resonant modes for a single resonant frequency.

The output of the frontend hardware 214 is passed to the primary power coupler 250. Primary power coupler 250 is configured to wirelessly transmit AC power 270 using the coil assembly 254. AC power 270 can include, but is not limited to, a high-frequency AC power in a range of several kilowatts to multi-megawatts, a high-frequency AC power with a fundamental frequency in a range of 10-100 kHz, and/or a high-frequency AC power with a fundamental frequency equal to or about 85 kHz (a standard nominal frequency for wireless charging vehicle batteries in the automotive industry).

Figure 3A:
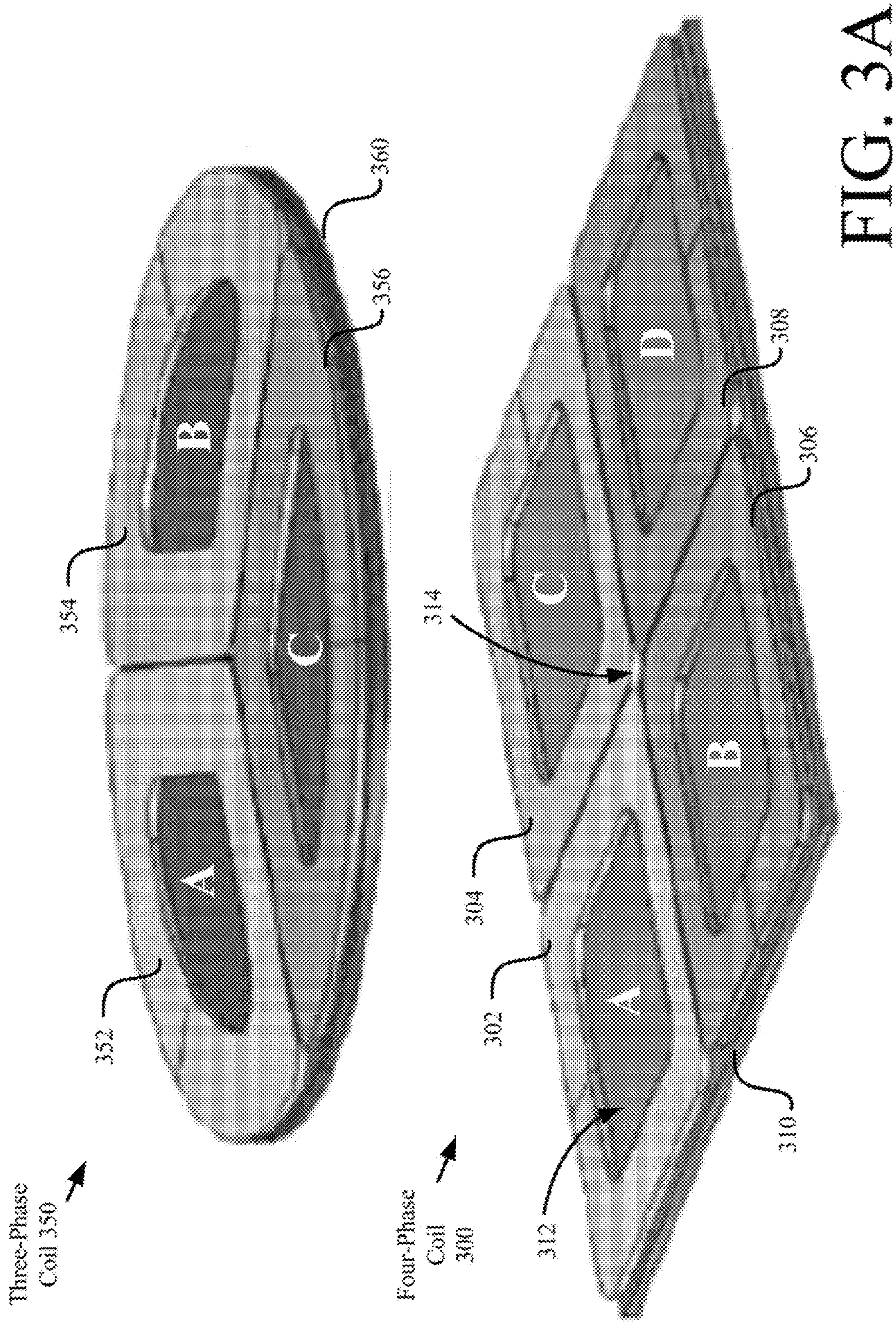
FIG. 3A provides perspective views of a four-phase coil assembly and a three-phase coil assembly with a circular geometry.
Figure 13A:
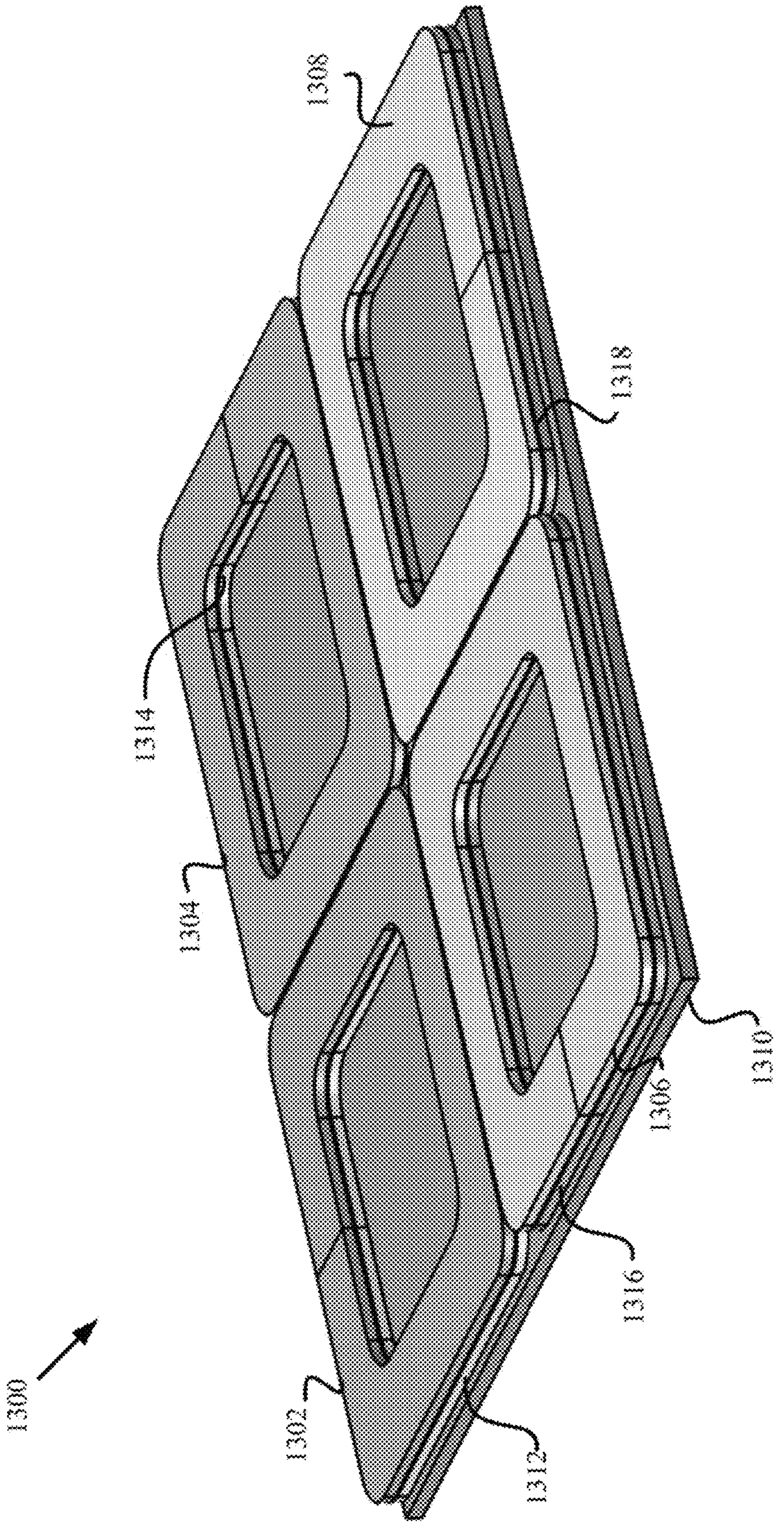
FIG. 13A provides a perspective view of a bipolar four-phase coil assembly.
Figure 14:
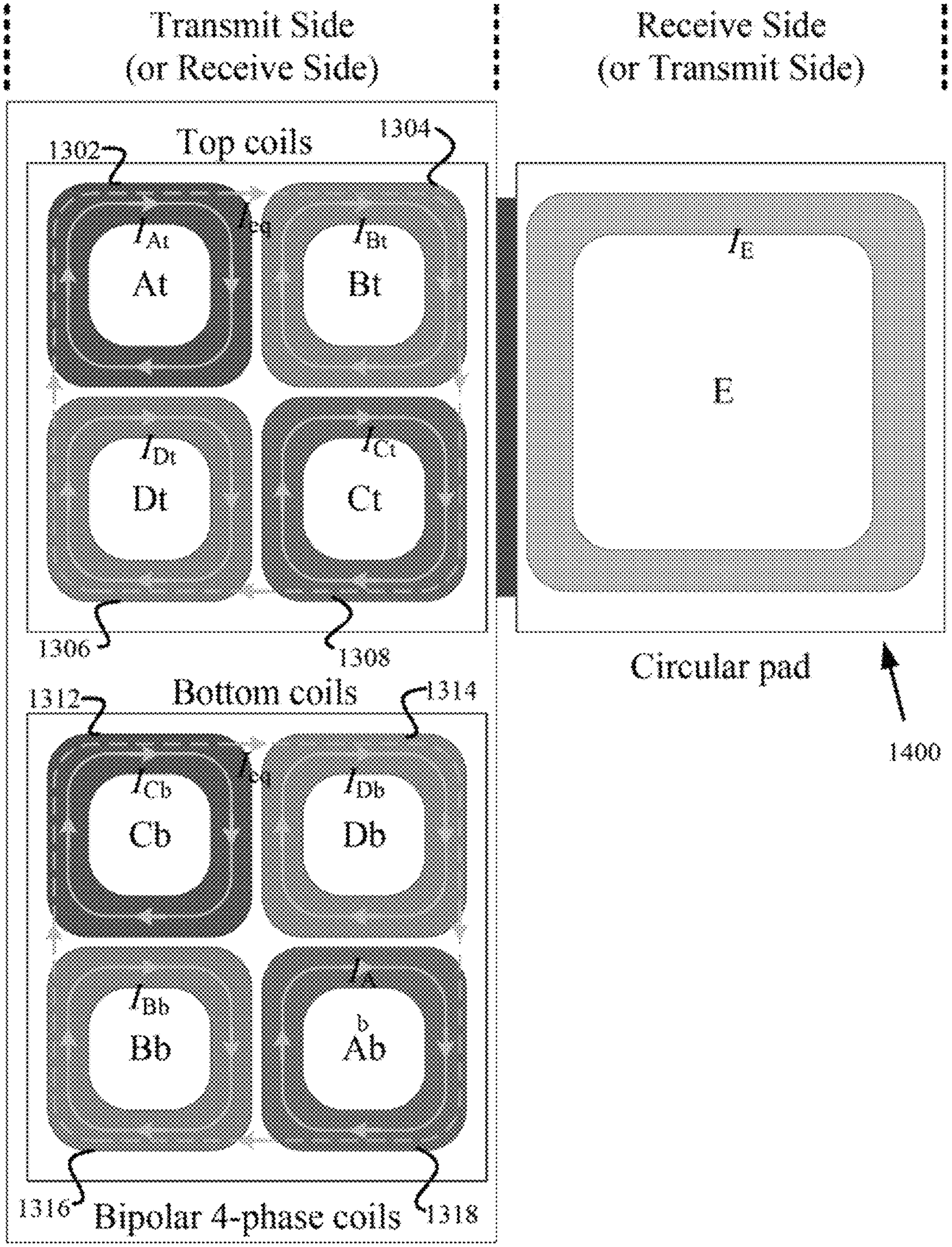
FIG. 14 provides an illustration showing coil current directions for a bipolar four-phase coil interoperating with a circular coil. The coil current direction of the circular coil is also shown. In this scenario, the bipolar four-phase coil is operating in a single phase circular mode.
Figure 15:
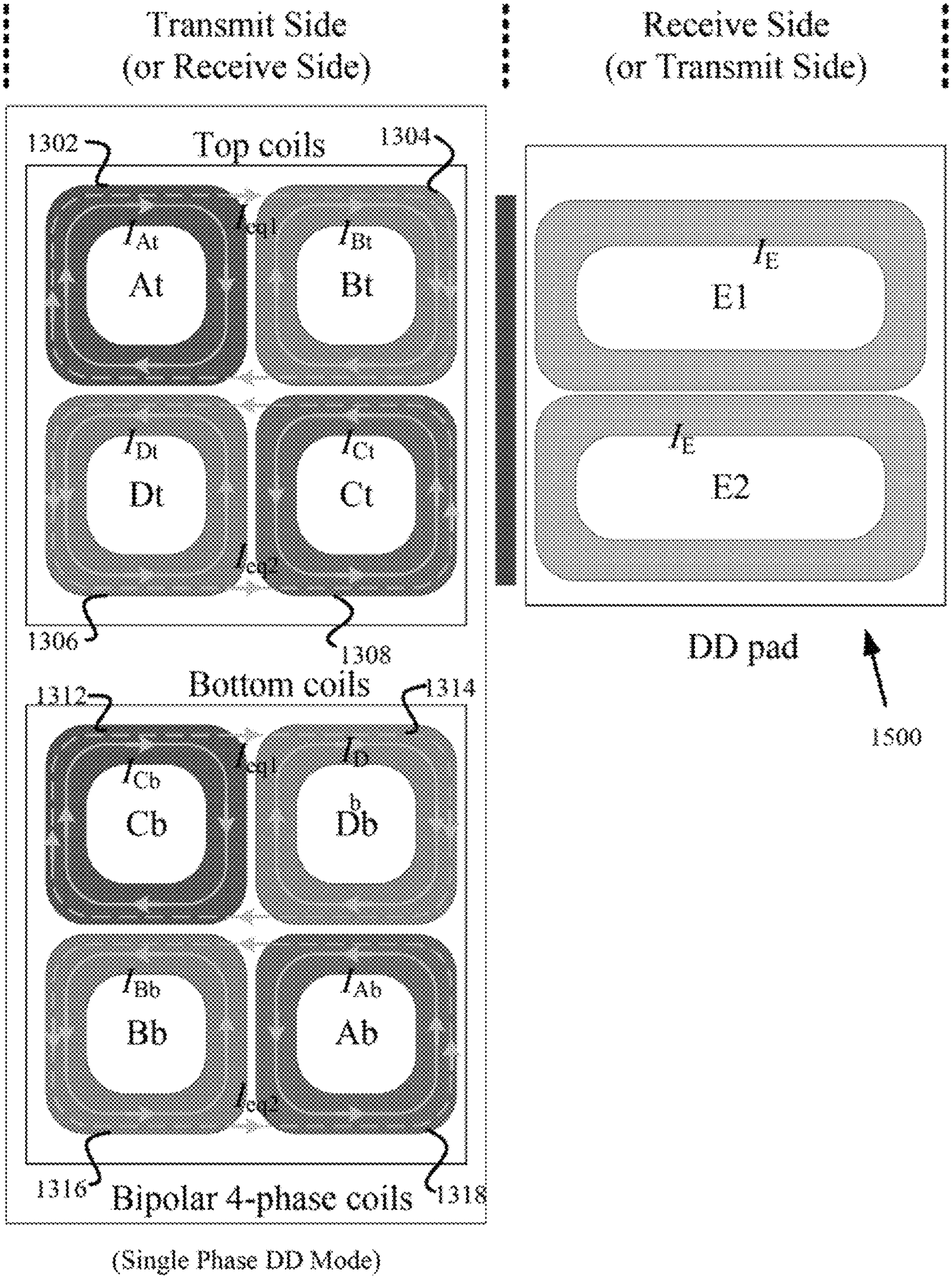
FIG. 15 provides an illustration showing coil current directions for a bipolar four-phase coil interoperating with a DD coil. The coil current directions of the DD coil are also shown. In this scenario, the bipolar four-phase coil is operating in a DD mode.

Coil assembly 254 may (i) comprise one or more layers of coils and/or (ii) be unipolar or bipolar. Illustrations of the unipolar scenario are provided in FIGS. 3-6, while illustrations of the bipolar scenario are provided in FIGS. 13-15. In the unipolar scenario, coils are provided on one side of the magnetic core as shown in FIG. 3A. In the bipolar scenarios, coils may be provided on the same side of the magnetic core as shown in FIG. 13A or provided on both opposing sides of the magnetic core.

In the unipolar scenario, coil assembly 254 may comprise four primary-side coils 206, 208, 210, 212 backed by a primary-side magnetic core 216. Coils 206, 208, 210, 212 can include, but are not limited to, polyphase coils. The polyphase coils are physically separated from each other but connected to each other so that multiple AC currents are produced. The AC currents are out of phase with each other. The phases are referred to as phase A, phase B, phase C, and/or phase D.

The transmitted AC power 270 is received by receiver 222 of electronic device 206. It should be noted that transmitter 204 resides off board the electronic device 206, while receiver 222 resides onboard the electronic device 206. Transmitter 204 and receiver 222 collectively provide a polyphase wireless power transfer system 260 for providing AC power to the electronic device 206 from the AC power source 202. In the scenario of FIG. 2, the polyphase wireless power transfer system 260 comprises the FPWPT (or 4φ-WPT) system.

Receiver 222 comprises a secondary coupler 252 and backend hardware 234. The secondary coupler 252 includes four secondary-side coils 224, 226, 228, 230 backed by a secondary-side magnetic core 232. Secondary-side magnetic core 232 can include, but is not limited to, ferrite, and/or nanocrystalline material. Transmitter coils 206, 208, 210, 212 and receiver coils 224, 226, 228, 230 are configured to induce into gap 218, cores 216 and 232 a spatially-dependent magnetic field distribution B(x, y; φ(t)) that rotates around an axis orthogonal to the four secondary-side coils 224, 226, 228, 230.

Backend hardware 234 is coupled to secondary coupler 1552. Backend hardware 234 can include, but is not limited to, a compensation network, a polyphase rectifier, and/or other electronic devices. The compensation network comprises an electronic circuit configured to compensate for poor stability or impedance mismatches. The polyphase rectifier comprises an electrical circuit or device configured to convert polyphase AC current into DC current. The DC current is provided to battery 240 for charging or recharging the same. Battery 240 may supply power to load. Load can include, but is not limited to, a vehicle or other electric device powered by a rechargeable internal power source.

Figure 3B:
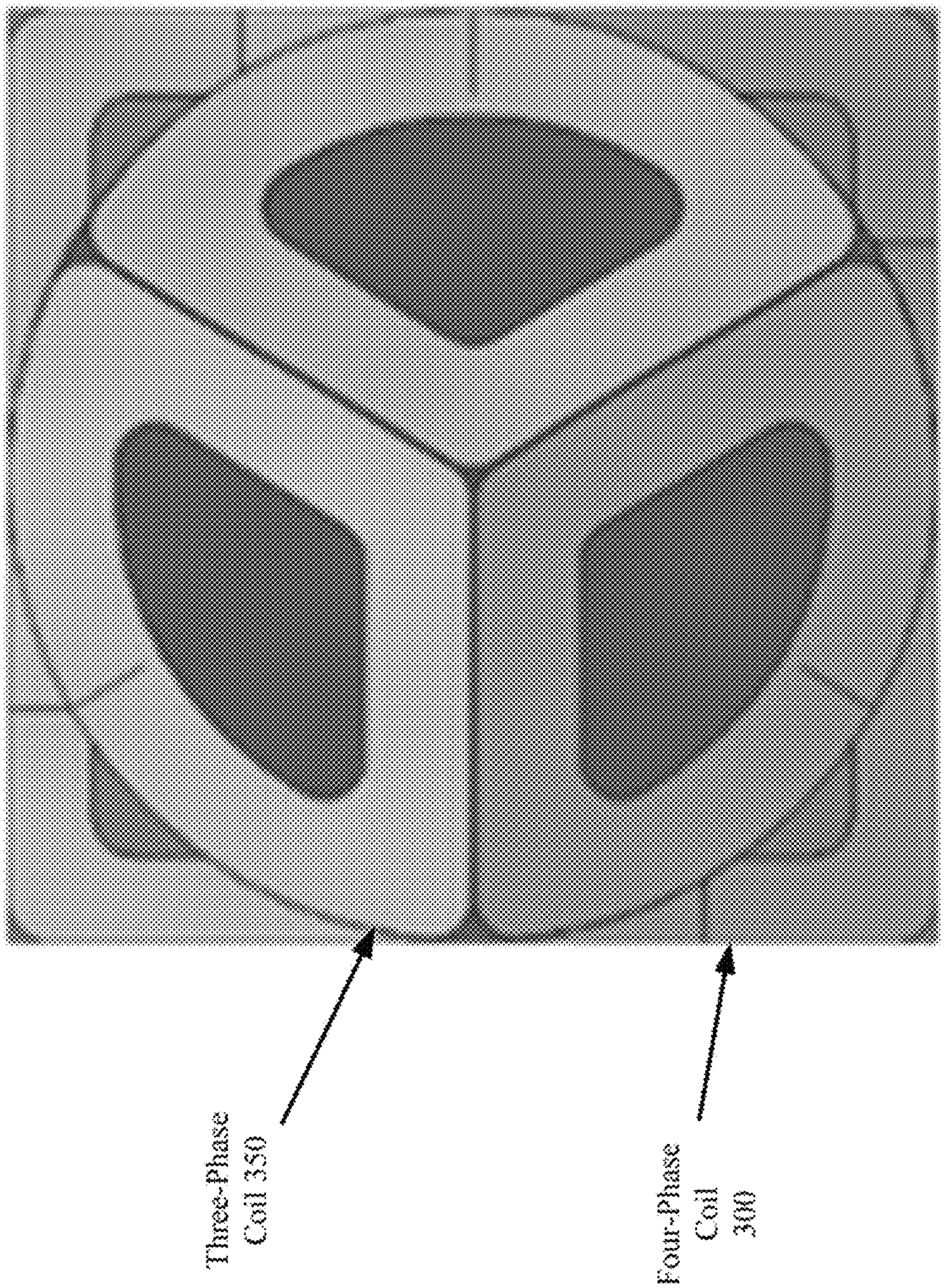
FIG. 3B shows a top view of the four-phase coil with the three-phase coil positioned thereabove.

FIG. 3 shows an illustrative architecture that is useful for understanding a unipolar four-phase coil 300 of the present solution's FPWPT system. Four-phase coil 300 is unipolar in this scenario since it includes a single layer of coils. The four-phase coil 300 may be implemented in the primary coupler 250 and/or the secondary coupler 252 of FIG. 2. In some scenarios, both the primary and secondary couplers comprise four-phase coil 300. In other scenarios, the primary coupler comprises four-phase coil 300, while the second coupler comprises a single-phase circular coil (e.g., circular coil 500 of FIG. 5) or a DD coil (e.g., DD coil 600 of FIG. 6). Alternatively, the secondary coupler comprises four-phase coil 300, while the primary coupler comprises a single-phase circular coil (see FIG. 5) or a DD coil (see FIG. 6).

Four-phase coil 300 is shown along with the corresponding three-phase coil 350 with a circular geometry for comparison. Four-phase coil 300 is shown to have a generally square shape. The present solution is not limited in this regard. The four-phase coil 300 may have a generally rectangular shape or other non-circular shape selected in accordance with a given application.

Four-phase coil 300 comprises four coils (or windings) 302, 304, 306, 308 disposed in a single layer on a magnetic core 310. Each coil (or winding) 302, 304, 306, 308 has a generally square perimeter shape. The present solution is not limited in this regard. Each coil (or winding) can have a generally rectangular shape or other non-pie shape selected in accordance with a given application. In those cases, the coils have the same perimeter shape and/or size so that each coil 302, 304, 306, 308 occupies ¼ of the layer. The corners of each coil may optionally comprise curved corners. Coils 302, 304, 306, 308 may be made of Litz wire, traces, or other conductive material. Coils 302, 304, 306, 308 have one polarity, e.g., A+, B+, C+, and D+. Coils 302, 304, 306, 308 are arranged to be offset from each other in the same plane such that they do not overlap each other within this plane. The plane extends parallel to the planar surface 312 of the magnetic core 310 on which the coils 302, 304, 306, 308 are disposed. Since the coils are planar and located on a single layer, the coils have the same distance to the magnetic core 310. Magnetic core 310 comprises a planar magnetic core with a generally or substantially square perimeter shape. Magnetic core 310 may be formed of ferrite or other magnetic material. Coils 302, 304, 306, 308 may be coupled to magnetic core 310 using, for example, a thermal epoxy which is not shown in FIG. 3. An optional cover or housing is also not shown in FIG. 3.

In contrast, three-phase coil 350 comprises three coils 352, 354, 356 disposed in a single layer on a magnetic core 360. Each coil 352, 354, 356 has a generally perimeter shape defined by a sector of a circle. As such, each coil of the single layer assembly occupies ⅓ of the circumference of the circular layer (e.g., 120°). Coils 352, 354, 356 may be made of Litz wire. Magnetic core 310 comprises a planar magnetic core with a generally or substantially circular perimeter shape.

The area of the four-phase coil 300 over that of the three-phase coil 350 is 4/π, or more than 27% larger. This leads to increased mutual coupling, reduced phase currents, and saving in the amount of Litz wire or other conductive material. A reduction of 23% or more may be achieved in a 1-MW system design.

Assuming perfect symmetry for the ground (denoted by subscript g) and electronic device (denoted by subscript v) coils, the inductance matrix can be expressed by mathematical equations (1)-(4).

$$LM = \begin{bmatrix} L_g & M_{gv} \\ M_{gv}^T & L_v \end{bmatrix}, \tag{1}$$

$$L_g = \begin{bmatrix} L_{g11} & M_{g1} & M_{g2} & M_{g1} \\ M_{g1} & L_{g11} & M_{g1} & M_{g2} \\ M_{g2} & M_{g1} & L_{g11} & M_{g1} \\ M_{g1} & M_{g2} & M_{g1} & L_{g11} \end{bmatrix} \tag{2}$$

$$M_{gv} = \begin{bmatrix} M_{gv11} & M_{gv1} & M_{gv2} & M_{gv1} \\ M_{gv1} & M_{gv11} & M_{gv1} & M_{gv2} \\ M_{gv2} & M_{gv1} & M_{gv11} & M_{gv1} \\ M_{gv1} & M_{gv2} & M_{gv1} & M_{gv11} \end{bmatrix} \tag{3}$$

$$L_v = \begin{bmatrix} L_{v11} & M_{v1} & M_{v2} & M_{v1} \\ M_{v1} & L_{v11} & M_{v1} & M_{v2} \\ M_{v2} & M_{v1} & L_{v11} & M_{v1} \\ M_{v1} & M_{v2} & M_{v1} & L_{v11} \end{bmatrix} \tag{4}$$

where $L_g$ defines the ground coil inductance ($L_{g11}$ represents the phase coil self-inductance), $M_{g1}$ represents the mutual inductance between one coil and one of its two neighboring coils, and $M_{g2}$ represents the mutual inductance between the two opposing coils. Similarly, $L_v$ defines the corresponding inductance for the v-coils. $M_{gv}$ defines the mutual inductance between the ground and vehicle coils. For example, $M_{gv11}$ represents the mutual inductance between ground and the corresponding phase coils. $M_{gv1}$ represents the mutual inductance between ground and one coil on one side and one of its two neighboring coils on the other side. $M_{gv2}$ represents the mutual inductance between the two opposing coils on each side.

Four-phase coil 300 can operate in four modes. The four modes include a 4-phase mode, a DD mode, a DD@θ mode, and a circular mode. It should be noted that the four-phase coil 300 creates a rotating magnetic field when in the 4-phase mode. No rotating magnetic field is created by the four-phase coil 300 when in the other modes, i.e., the DD mode, the DD@θ mode, and the circular mode.

Figure 4:
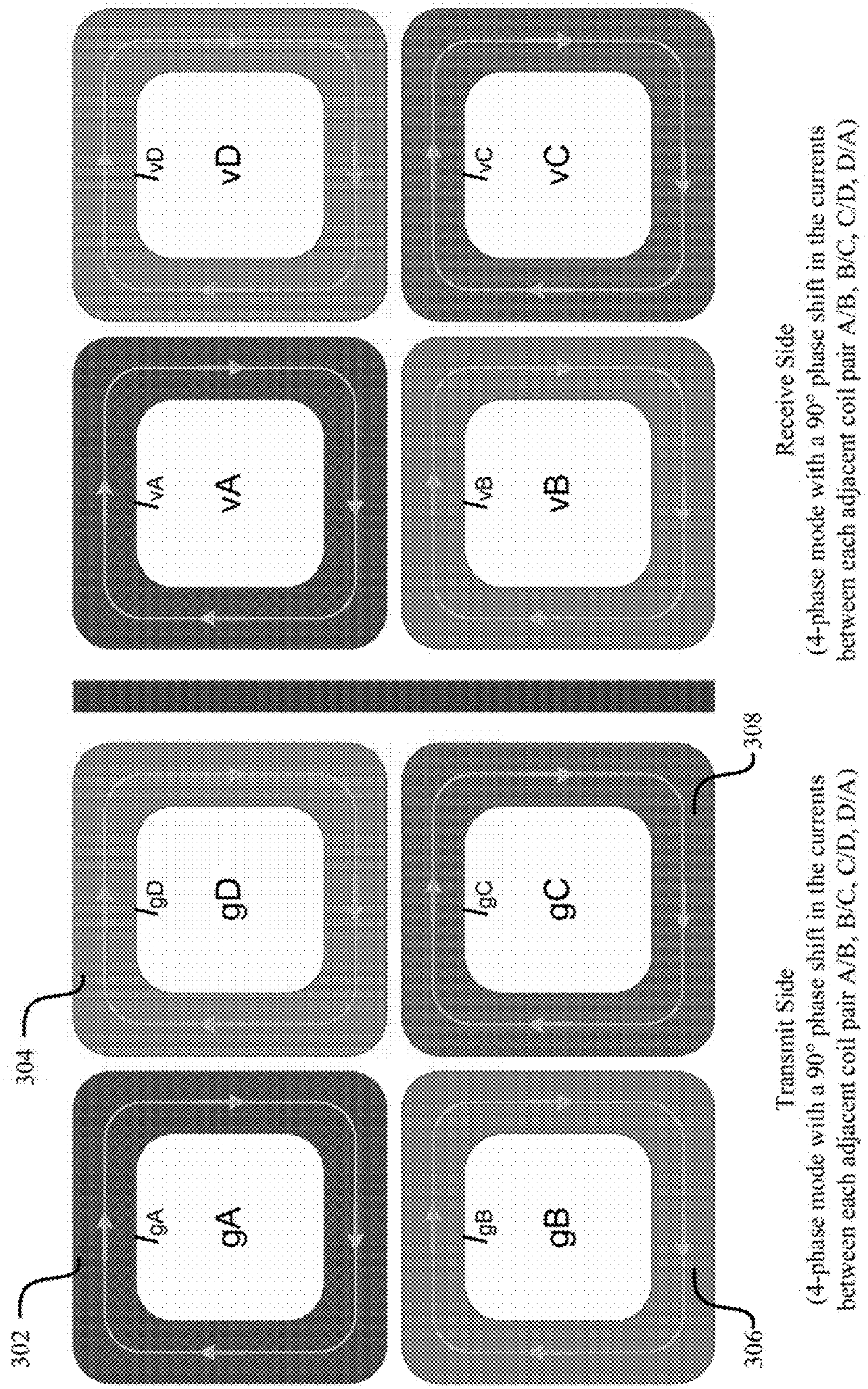
FIG. 4 provides an illustration showing coil current directions for a transmit side and coil current directions for a receive side of a wireless power transfer system (i) with a unipolar four-phase coil on both the transmit and receive sides and (ii) with the unipolar four-phase coils operating in 4-phase modes.

The 4-phase mode is used when both the transmit side and the receive side of the WPT system comprises four-phase coil 300, as shown in FIG. 4. As seen in FIG. 4, positive polarity of all the coil currents points to the same direction when the coil assembly is in the 4-phase mode. There is a 90° phase shift in the AC current between each adjacent coil pair 302/306, 306/308, 308/304, 304/302. In an ideal case, there is also a 90° phase shift in the AC current between corresponding phase coil pair gA/vA, gB/vB, gC/vC, gD/vD.

Figure 5:
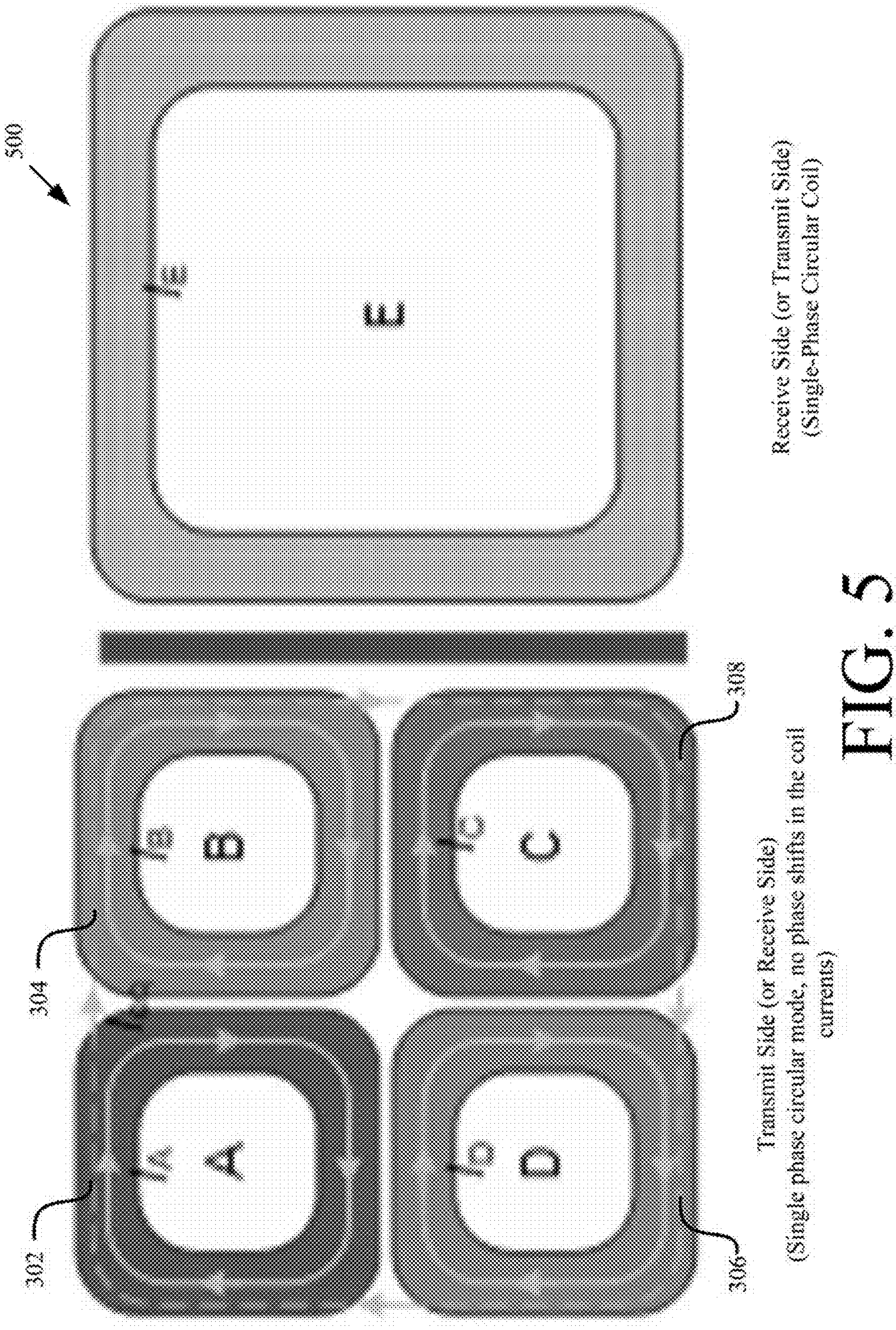
FIG. 5 provides an illustration showing coil current directions for a unipolar four-phase coil interoperating with a circular coil. The coil current direction of the circular coil is also shown. In this scenario, the unipolar four-phase coil is operating in a single phase circular mode.

The single-phase circular mode is used when one of the sides of the WPT system comprises four-phase coil 300 and the other side of the WPT system comprises a circular coil, as shown in FIG. 5. As seen in FIG. 5, current flows in the same direction through all four coils 302, 304, 306, 308.

Figure 6A:
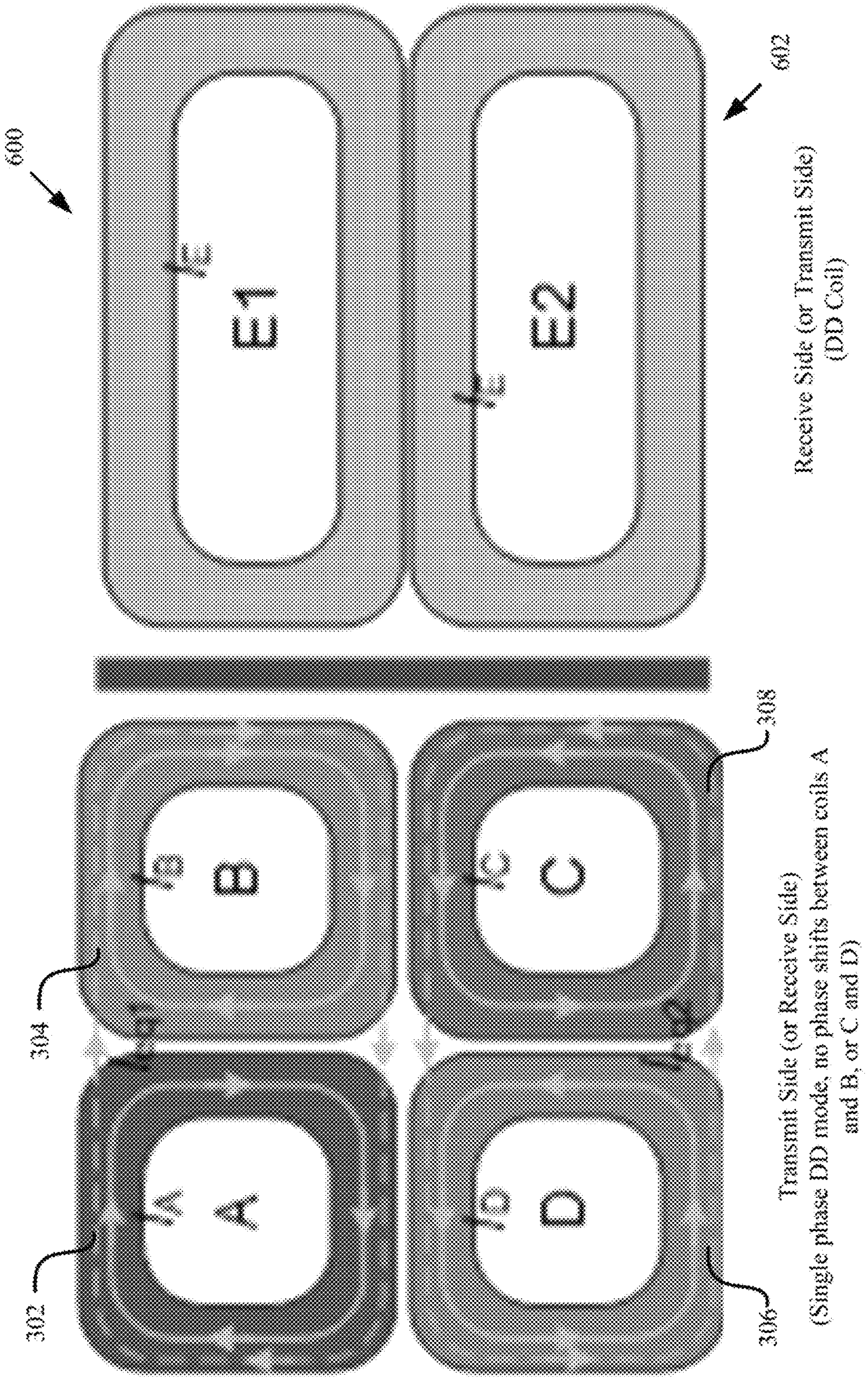
FIG. 6A provides an illustration showing coil current directions for a unipolar four-phase coil interoperating with a DD coil. The coil current directions of the DD coil are also shown. In this scenario, the unipolar four-phase coil is operating in a DD mode.

The single-phase DD mode is used when one of the sides of the WPT system comprises four-phase coil 300 and the other side of the WPT system comprises a DD coil 600, as in FIG. 6A. As seen in FIG. 6A, current flows in a first direction through coils 302, 304 and flows in the opposite direction through coils 306, 308. In this case, there is no 90° phase shift in the AC current between each adjacent coil pair.

Figure 6B:
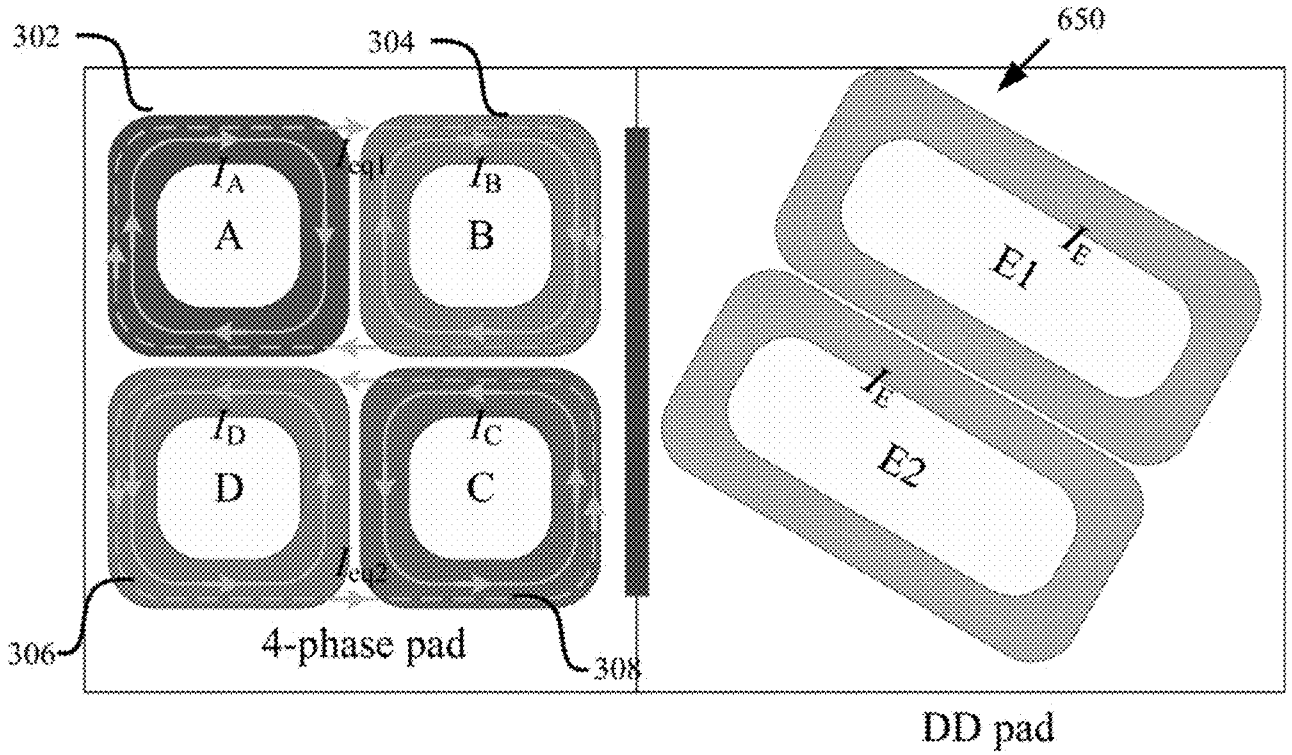
FIG. 6B provides illustration showing coil current directions for a unipolar four-phase coil interoperating with a DD coil. The coil current directions of the DD coil are also shown. In this scenario, the unipolar four-phase coil is operating in the DD@θ mode.
Figure 7A:
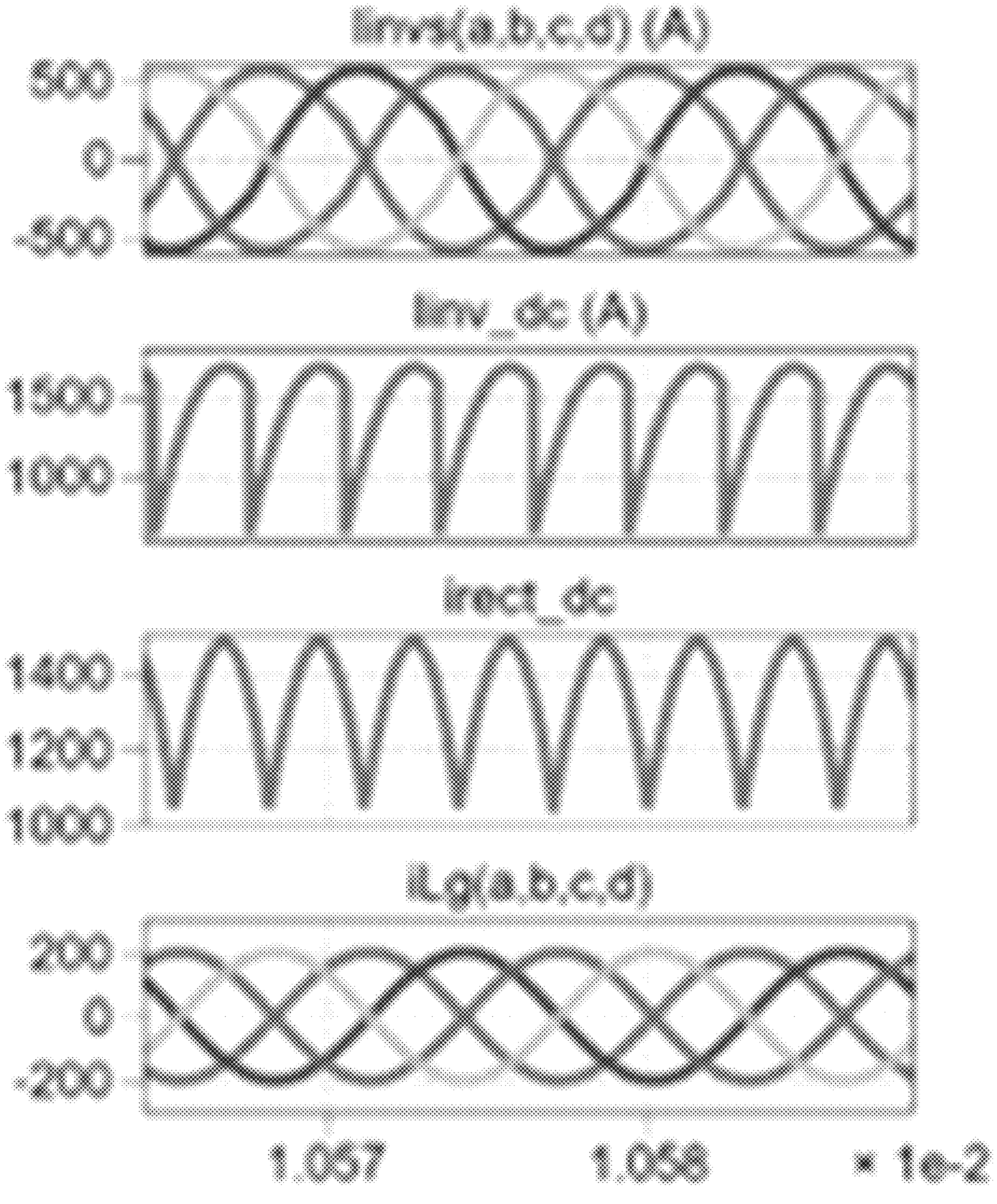
FIGS. 7A-7D (collectively referred to as "FIG. 7") provide graphs showing simulation results for comparison of ripple currents in an inverter and rectifier DC currents for the 4-phase mode, DD mode, DD@45° mode, and circular operation mode of the unipolar four-phase coil.
Figure 7B:
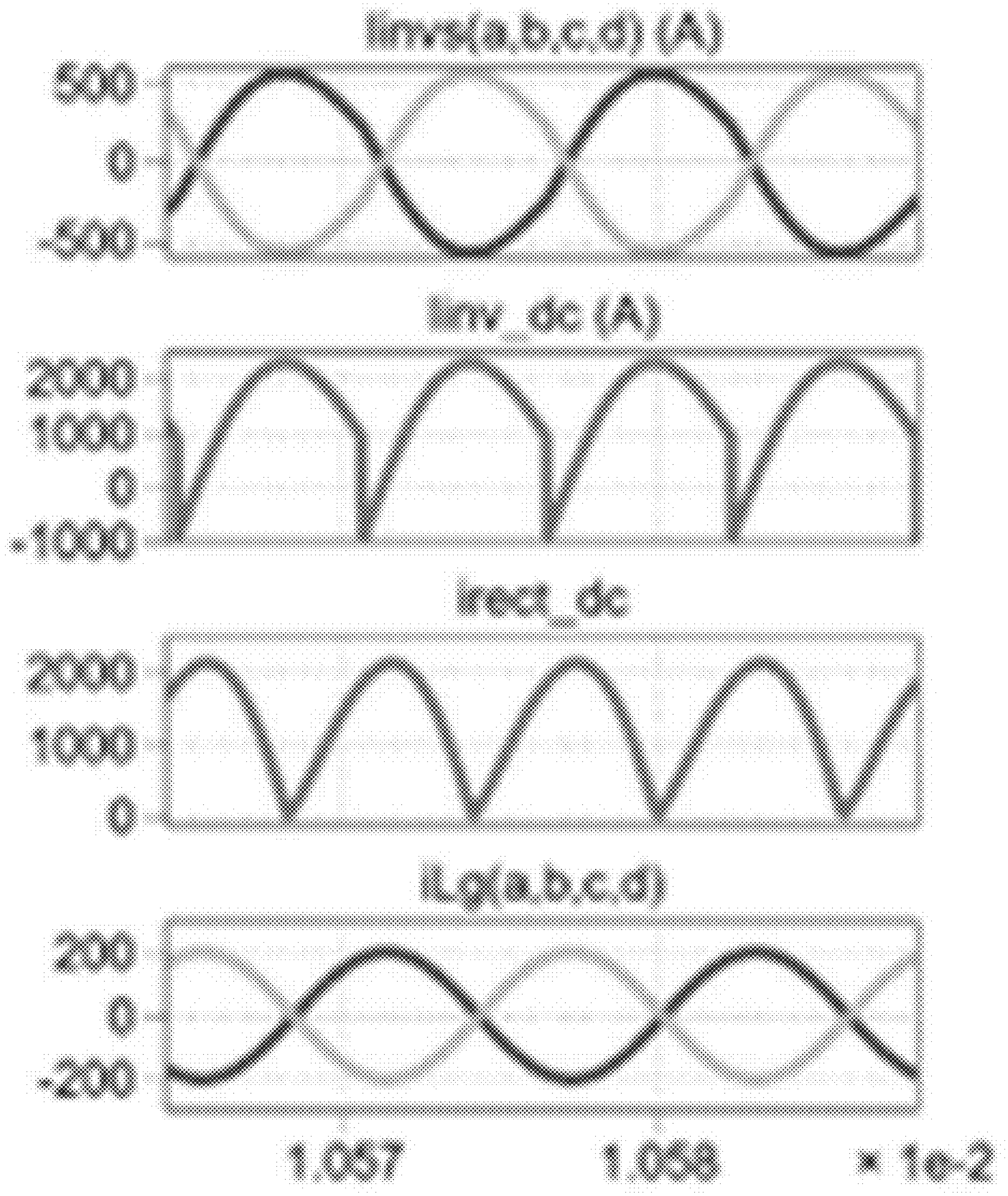
Figure 7C:
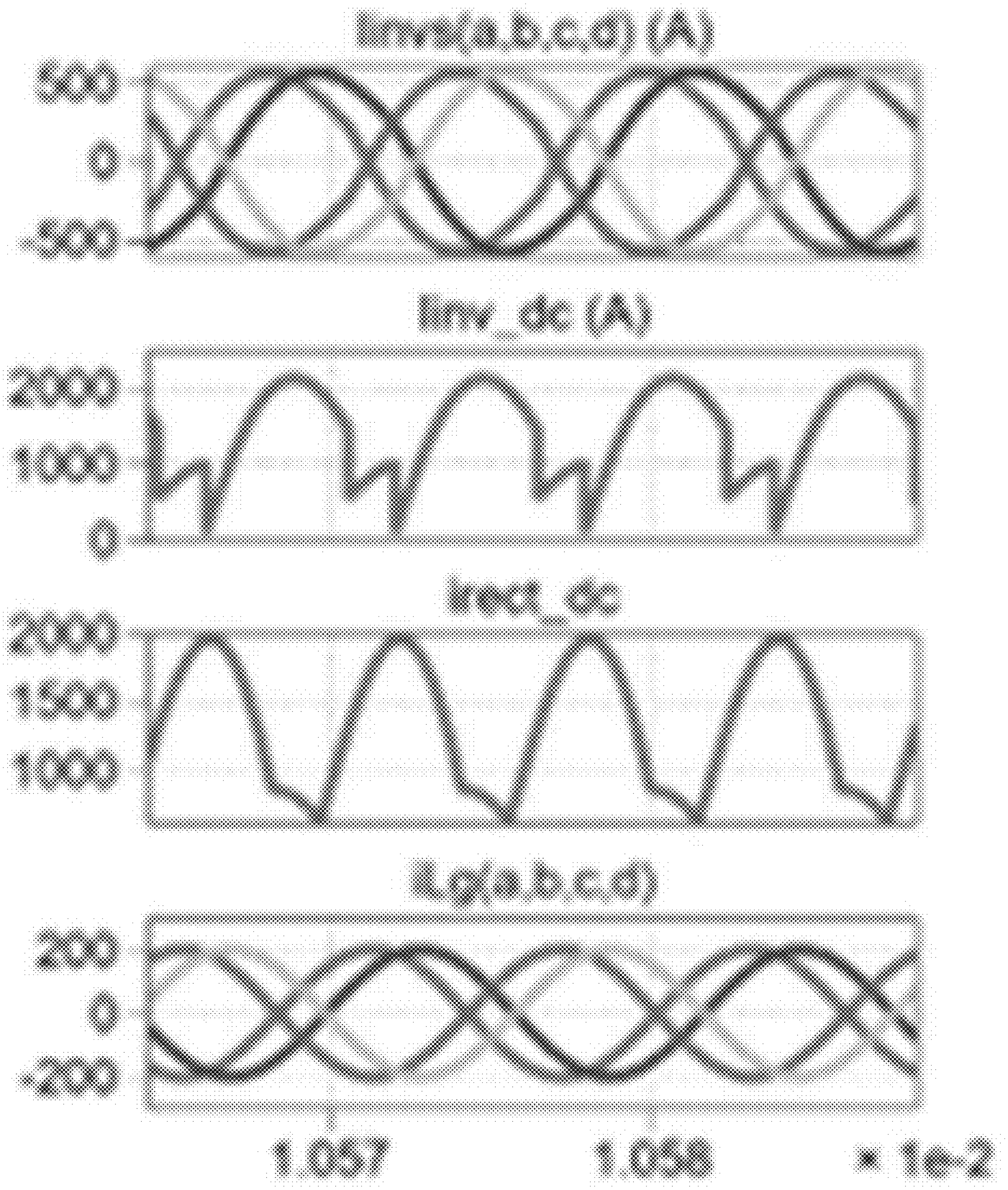
Figure 7D:
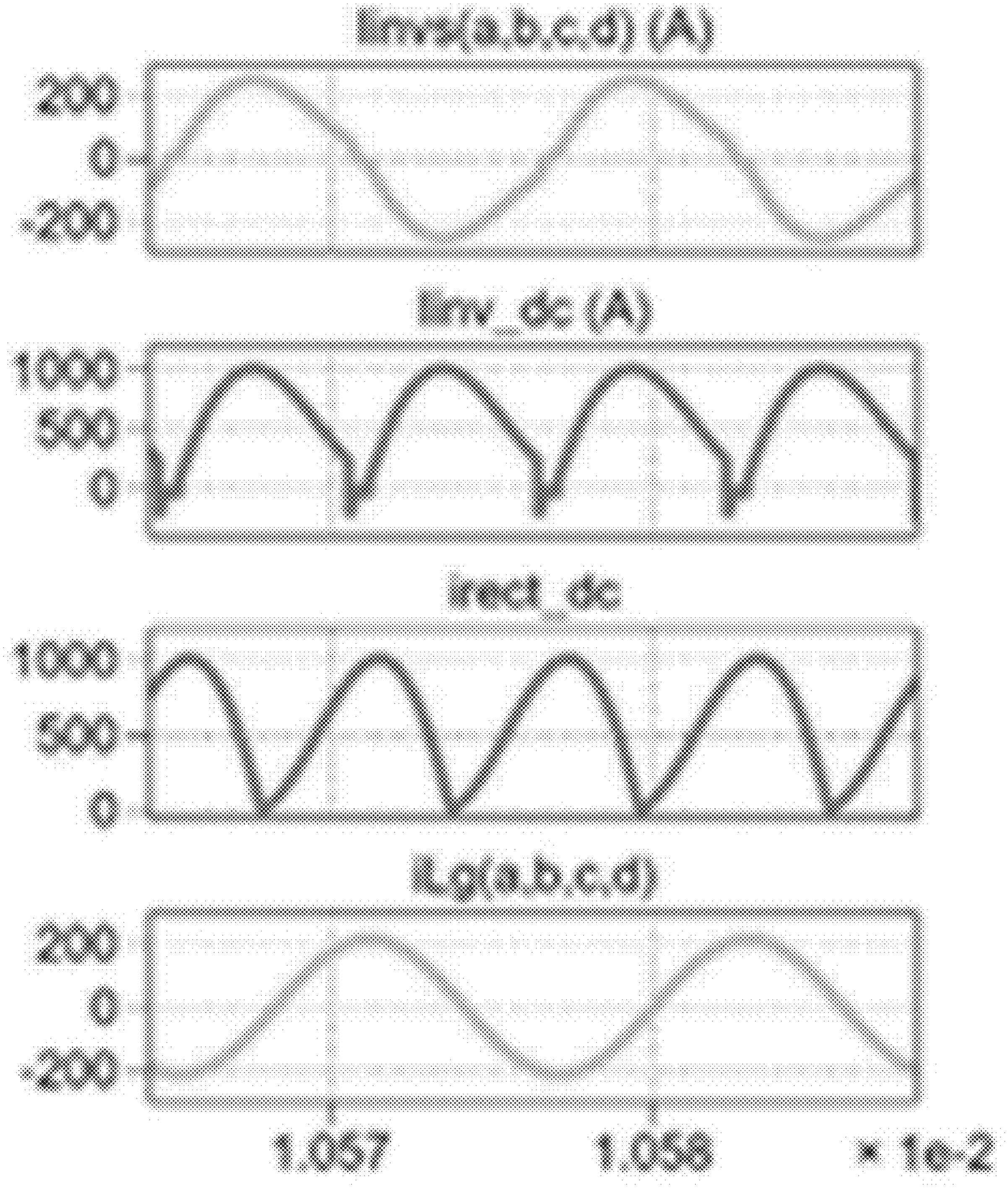

The DD@θ mode is used when one of the sides of the WPT system comprises four-phase coil 300 and the other side of the WPT system comprises an angled DD coil 650, as shown in FIG. 6B. In the DD@θ mode, current flows in a first direction through coils 302, 304 and current flows in an opposite direction through coils 306, 308.

The modes may be selectively, dynamically, and/or automatedly changed by controlling the direction of the current supplied to each of coils 302, 304, 306, 308 of the four-phase coil assembly. For example, the mode of the four-phase coil 300 may be set to the 4-phase mode when the other coil of the WPT system is also a four-phase coil. The mode of the four-phase coil 300 may be transitioned to the DD mode when the other coil of the WPT system is changed to a DD coil. The mode of the four-phase coil 300 may be transitioned to the circular mode when the other coil of the WPT system is changed to a circular coil. This may occur, for example, if the following scenario occurs: (i) during a first charging cycle the first vehicle has a four-phase coil; (ii) during a second charging cycle the second vehicle has a DD coil; and during a third charging cycle the third vehicle has a circular coil. The present solution is not limited to the particulars of this example.

TABLE 1 shows the current vectors associated with the listed modes of the four-phase coil 300. FIG. 4 illustrates the coil currents $i_{gA}$, $i_{gB}$, $i_{gC}$, $i_{gD}$ for the transmit side and the coil currents $i_{vA}$, $i_{vB}$, $i_{vC}$, $i_{vD}$ for the receive side of the WPT system. TABLE 1 also shows single-phase equivalent inductance for use in compensation network design, well-known in the field.

TABLE 1

| Mode | Current vectors | Inductance for tuning |
|---|---|---|
| 4-phase | $\begin{cases} i_{gA} = I_g \\ i_{gB} = -jI_g \\ i_{gC} = -I_g \\ i_{gD} = jI_g \end{cases}$ | $\begin{cases} L_{geq} = L_{g11} - M_{g2} \\ L_{veq} = L_{v11} - M_{v2} \\ M_{eq} = M_{gv11} - M_{gv2} \end{cases}$ |
| DD | $\begin{cases} i_{gA} = i_{gB} = I_g \\ i_{gC} = i_{gD} = -I_g \end{cases}$ or $\begin{cases} i_{gA} = i_{gD} = I_g \\ i_{gB} = i_{gC} = -I_g \end{cases}$ | |
| DD@θ | $\begin{cases} i_{gA} = -i_{gC} = I_g \\ i_{gB} = -i_{gD} = I_g e^{-j\theta} \end{cases}$ | |
| Circular | $i_{gA} = i_{gB} = i_{gC} = i_{gD} = i_g$ | $\begin{cases} L_{geq} = L_{g11} + 2M_{g1} + M_{g2} \\ L_{veq} = L_{v11} + 2M_{v1} + M_{v2} \\ M_{eq} = M_{gv11} + 2M_{gv1} + M_{gv2} \end{cases}$ |
| All | $i_{v(A,B,C,D)} = -ji_{(A,B,C,D)}$ | |

The circular and DD modes are useful for interoperating with a single-phase circular coil at the receive side (see FIG. 5) or a DD coil at the receive side (see FIG. 6), with the former at reduced and the latter at the same level of power transfer. The native 4-phase mode leads to reduced ripple current at the inverter DC input and the rectifier DC output current, and more evenly distributed flux and losses, as is shown in the simulation results of FIG. 7.

Four-phase coil 300 is interoperable with a differential inductive positioning system (DIPS) for wireless EV charging alignment. DIPS is the current standard for vehicle alignment in wireless charging applications. The DIPS configuration consists of (1) a four-coil array on the ground assembly (GA) and (2) a specialized coil on the vehicle assembly (VA). The four-coil array may comprise four vertically oriented coils, and the specialized coil may comprise a horizontally oriented coil. This coil arrangement enables detection of X- and Y-directional misalignments between GA and VA.

In the FPWPT system, the four phase windings 302, 304, 306, 308 are arranged symmetrically around the pad center 314, forming orthogonal magnetic field components that naturally correspond to the DIPS coil layout. This geometric symmetry allows the FPWPT coils 302, 304, 306, 308 to serve a dual purpose: (1) as power-transfer coils during normal operation; and (2) as position-sensing coils when driven with a low-frequency excitation or interrogated by the DIPS sensor electronics.

Such integration eliminates the need for separate position-sensing coils, reducing pad complexity, material cost, and overall thickness. Additionally, the FPWPT configuration maintains compatibility with conventional DIPS sensors, allowing vehicles equipped with standard receivers to align accurately with a four-phase transmitter pad without additional hardware modifications. This interoperability facilitates practical deployment of the present FPWPT system within the existing SAE J2954 ecosystem and simplifies vehicle-pad alignment for both single- and multi-phase charging systems.

Simulation Results: A 1-MW four-phase WPT system was designed with both the ground and vehicle pads measured 1 meter by 1 meter with an air gap of 240 mm. A comprehensive FEA was performed to compare the flux and loss density distribution in the 4-phase, circular, DD operation modes at the same coil current. Results show more even distributions of the flux and losses in the ferrite plates with the 4-phase mode. At the same level of 1 MW power transfer, the DD mode generates a maximum flux density of 0.287 T and loss density of 625 kW/m$^3$ compared with 0.242 T and 431 kW/m$^3$ for the 4-phase mode. The DD with a 45-degree phase shifted current has flux and loss density between the former two modes. The circular mode has a significantly reduced power transfer capability (<50%) at a much-reduced flux density and loss in the ferrites.

Figure 8:
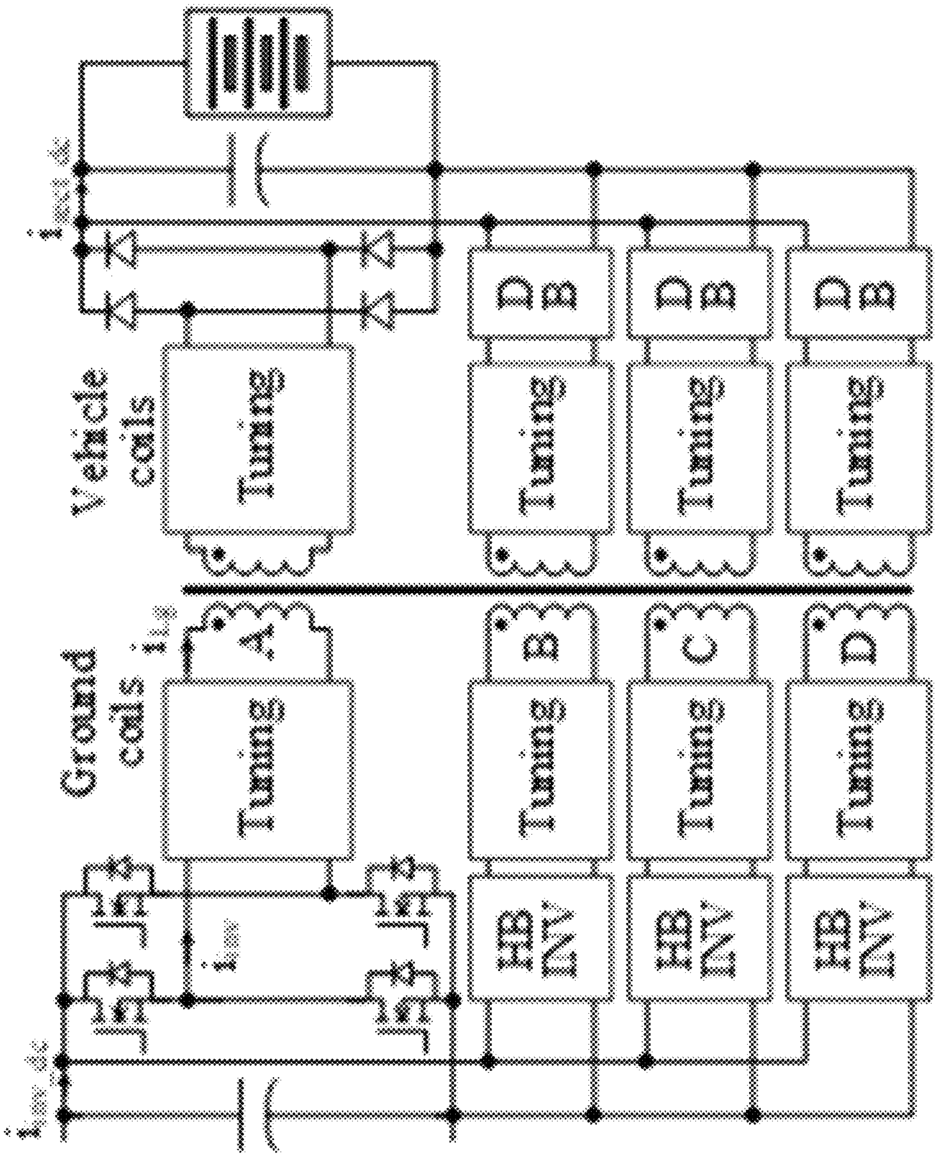
FIG. 8 provides a circuit diagram for a four-phase WPT (FPWPT) system with an open-ended coil configuration.
Figure 9:
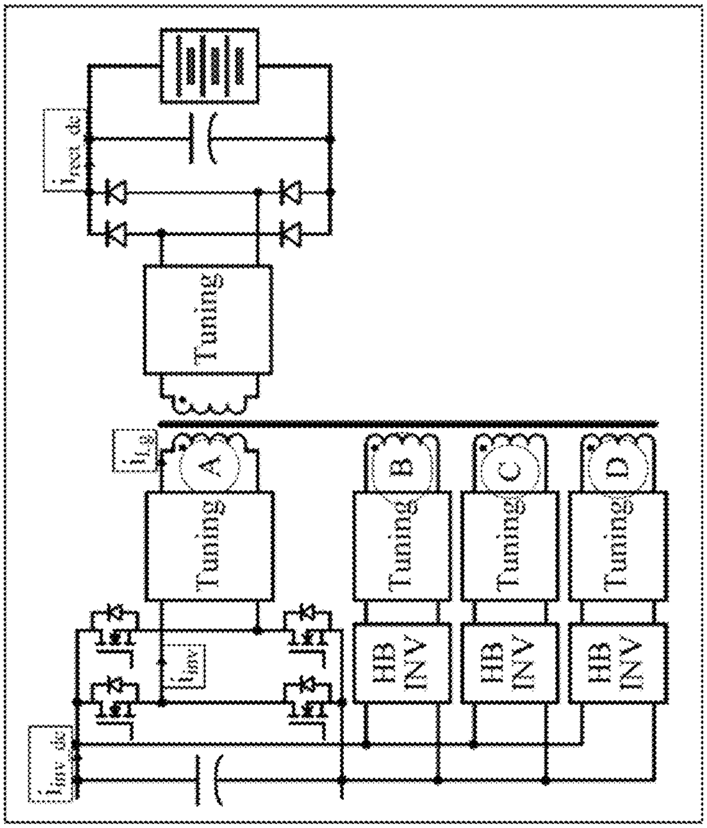
FIG. 9 provides a circuit diagram for a circuit in which power is transferred from a unipolar four-phase coil operating in 4single-phase DD or circular mode to a single-phase DD or circular coil.
Figure 10:
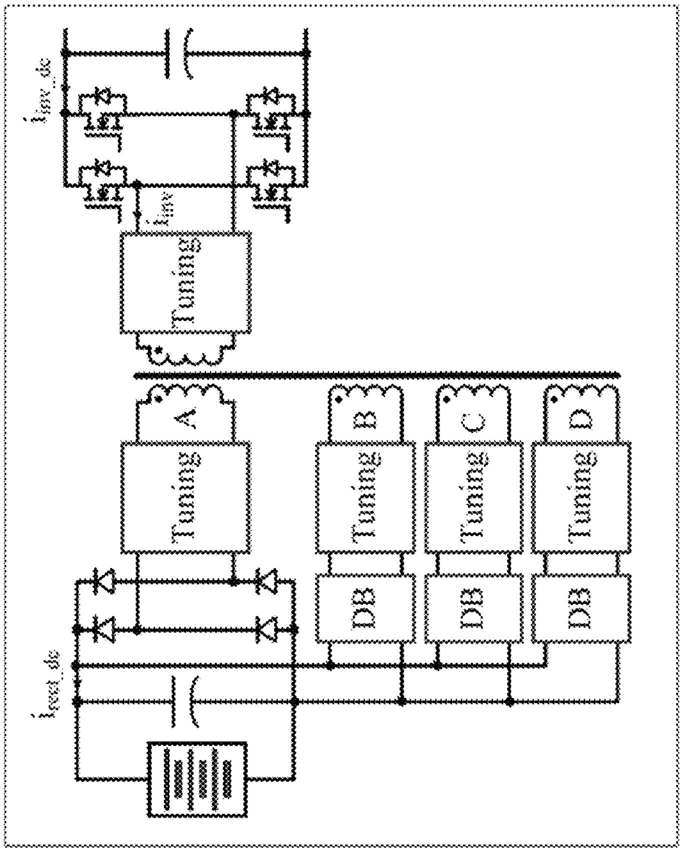
FIG. 10 provides a circuit diagram for a circuit in which power is transferred from a single-phase DD or circular coil to a unipolar four-phase coil operating in a DD or circular mode.

Circuit level simulations were carried out in PLECS. FIG. 8 shows the system model 800 used for simulation of a WPT system with a unipolar four-phase coil assembly. FIG. 7 shows the simulated current waveforms. TABLE 2 shows results for comparison of the ripple currents in per centage of the DC average currents in the inverter and rectifier DC current for the 4-phase, DD, DD@45, and circular operation modes. The 4-phase mode has the lowest inverter and rectifier DC ripple current while the single-phase DD mode has the highest ripple current.

TABLE 2

| Mode | Output Power (W) | Inverter DC current ripple (%) | Rectifier DC current ripple (9%) |
|---|---|---|---|
| 4-phase | 1067.1 | 21.4 | 9.8 |
| DD | 1066.9 | 61.0 | 50.1 |
| DD@45° | 1066.9 | 41.6 | 34.9 |
| Circular | 440.3 | 55.6 | 56.7 |

Figure 11:
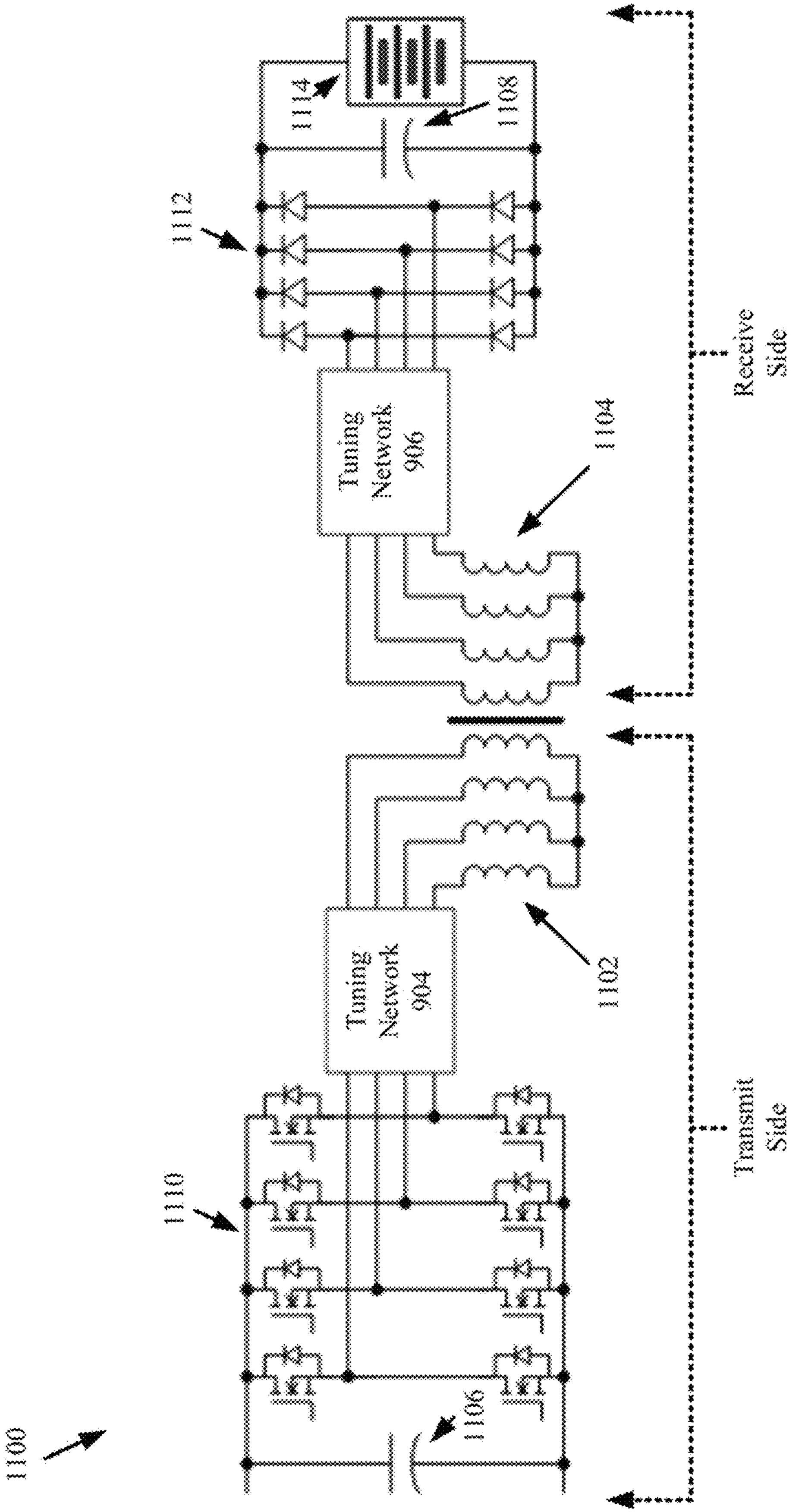
FIG. 11 provides a circuit diagram of an FPWPT system with Y (wye)-connected coils.
Figure 12:
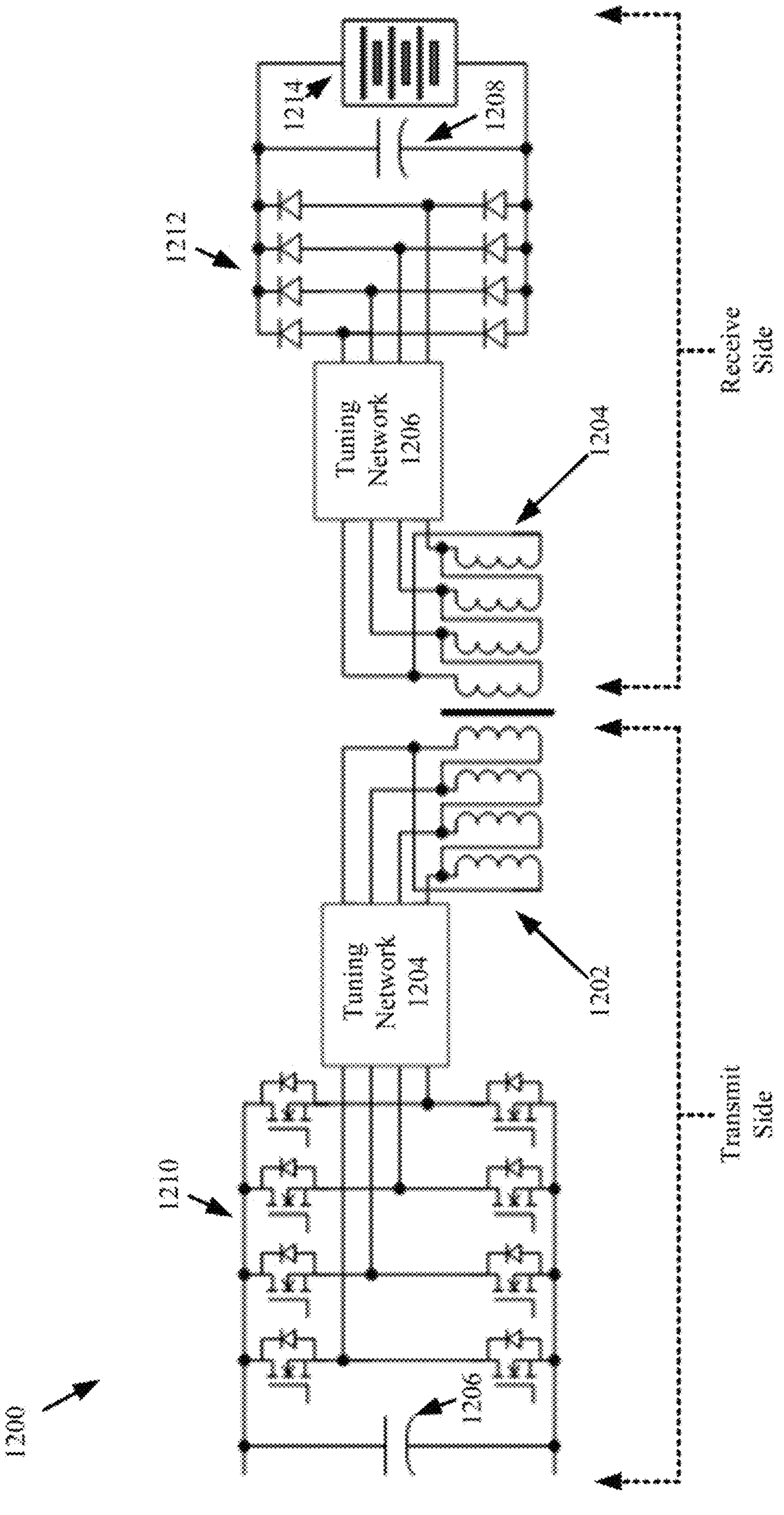
FIG. 12 provides a circuit diagram of an FPWPT system with Δ (delta)-connected coils.

FPWPT systems 1100, 1200 of the present solution can have Y-connected phase coils 1102, 1104 as shown in FIG. 11 or delta-connected phase coils 1202, 1204 as shown in FIG. 12. A high-frequency inverter 1110, 1210 may be provided on the transmit side to convert DC to AC for the transmitter coils 1102, 1202. A rectifier 1112, 1212 may be provided on the receive side to convert the AC back to DC for charging battery 1214.

Tuning networks 1104, 1106, 1204, 1206 may be provided on the transmit side and the receive side of the FPWPT systems 1100, 1200. Each tuning network 1104, 1106, 1204, 1206 can include, but is not limited to, series passive components (e.g., inductors, capacitors, etc.), parallel passive components (e.g., inductors, capacitors, etc.), an LCC circuit, and/or a combination thereof.

FPWPT systems 1100, 1200 may be used for high-power charging applications. Compared with a conventional circular three-phase WPT system, the proposed four-phase design achieves higher mutual coupling, lower coil current, and reduced Litz wire by fully utilizing the area of a square layout. The four-phase coils 1102, 1104, 1202, 1204 can be rectangular shaped, providing greater flexibility for integration in constrained under-vehicle installation spaces. FPWPT systems 1100, 1200 also exhibit good interoperability with a single-phase circular coil 500 and DD coils 600, 602. Furthermore, it mitigates flux and loss crowding, suppresses ripple current in the inverter and rectifier DC currents, and reduces stray field emissions. These characteristics lessen the requirements on the DC bus filter capacitor 1106, 1108, 1206, 1208 and electromagnetic shielding, thereby improving safety and efficiency.

Figure 13B:
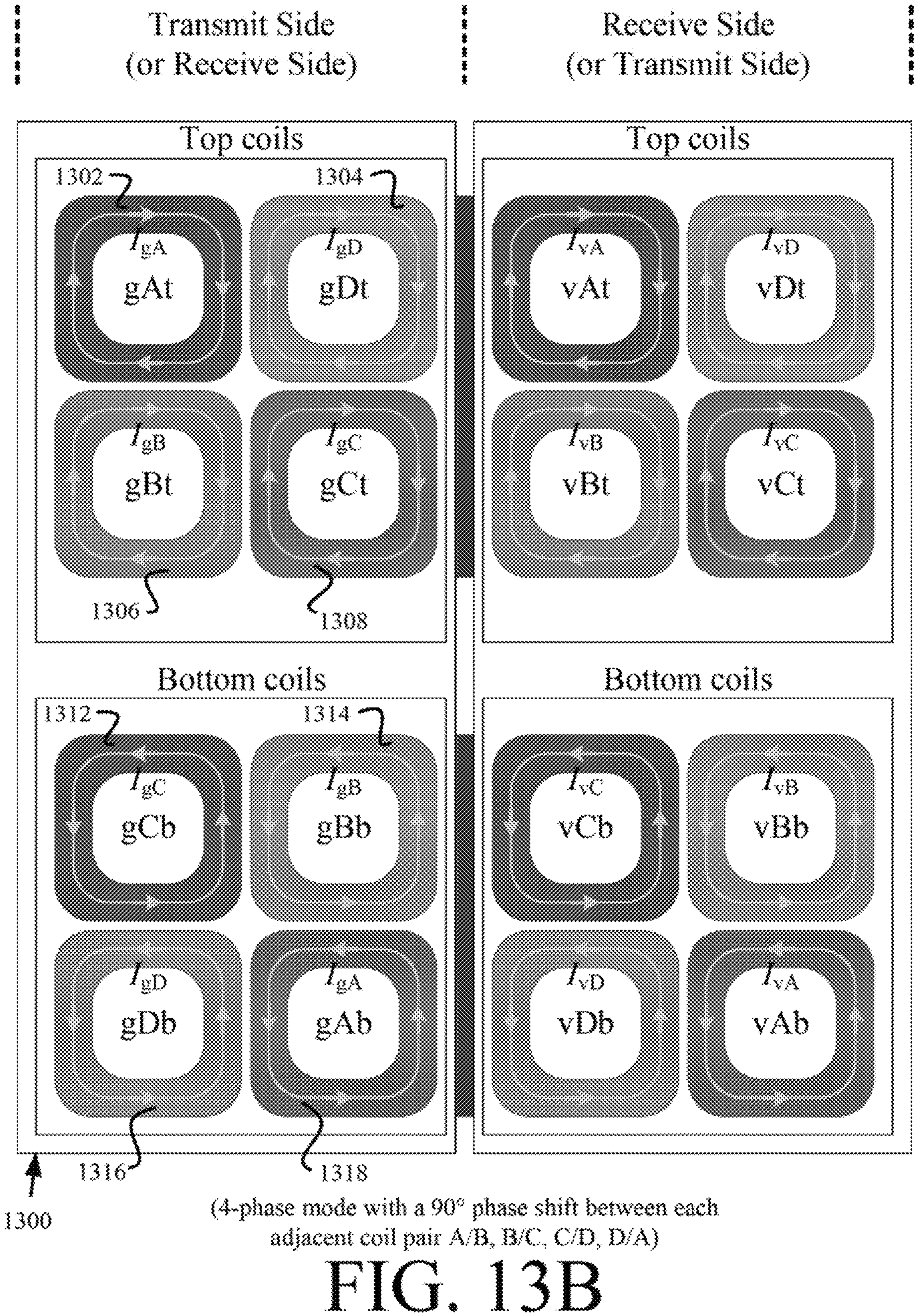
FIG. 13B provides an illustrative architecture that is useful for understanding a bipolar four-phase coil of the present solution's FPWPT system. The illustration shows coil current directions for a transmit side and coil current directions for a receive side of a wireless power transfer system (i) with a bipolar four-phase coil on both the transmit and receive sides and (ii) with the bipolar four-phase coils operating in 4-phase modes.

FIG. 13 shows an illustrative architecture that is useful for understanding a bipolar four-phase coil 1300 of the present solution's FPWPT system. Four-phase coil 1300 is bipolar in this scenario since it includes multiple layers of coils. The layers include a top layer of coils and a bottom layer of coils. The four-phase coil 1300 may be implemented in the primary coupler 250 and/or the secondary coupler 252 of FIG. 2. In some scenarios, both the primary and secondary couplers comprise four-phase coil 1300. In other scenarios, the primary coupler comprises four-phase coil 1300, while the second coupler comprises a single-phase circular coil (e.g., circular coil 1400 of FIG. 14) or a DD coil (e.g., DD coil 1500 of FIG. 15). Alternatively, the secondary coupler comprises four-phase coil 1300, while the primary coupler comprises a single-phase circular coil (see FIG. 14) or a DD coil (see FIG. 15).

Four-phase coil 1300 comprises four top coils 1302, 1304, 1306, 1308 and four bottom coils 1312, 1314, 1316, 1318 disposed in two layers on a magnetic core 1310. Each coil 1302, 1304, 1306, 1308, 1312, 1314, 1316, 1318 has a generally square perimeter shape. The present solution is not limited in this regard. Each coil can have a generally rectangular shape or other non-pie shape selected in accordance with a given application. In those cases, the coils have the same perimeter shape and/or size so that each coil 1302, 1304, 1306, 1308, 1312, 1314, 1316, 1318 occupies ¼ of the respective layer. The corners of each coil may optionally comprise curved corners. Coils 1302, 1304, 1306, 1308, 1312, 1314, 1316, 1318 may be made of Litz wire, traces, or other conductive material.

Each coil 1302, 1304, 1306, 1308, 1312, 1314, 1316, 1318 has one polarity, e.g., A+, B+, C+, D+, A−, B−, C−, D−. The coils 1302, 1304, 1306, 1308 on the top layer have the same polarity, while the coils 1312, 1314, 1316, 1318 on the bottom layer have the opposite polarity.

On each layer, coils 1302, 1304, 1306, 1308 or 1312, 1314, 1316, 1318 are arranged to be offset from each other in the same plane such that they do not overlap each other within this plane. The plane extends parallel to the planar surface of the magnetic core 1310 on which the coils 1302, 1304, 1306, 1308 or 1312, 1314, 1316, 1318 are disposed. Since the coils of each set of four coils are planar and located on a single layer, the coils have the same distance to the magnetic core 1310.

Magnetic core 1310 comprises a planar magnetic core with a generally or substantially square perimeter shape. Magnetic core 1310 may be formed of ferrite or other magnetic material. Coils 1302, 1304, 1306, 1308, 1312, 1314, 1316, 1318 may be coupled to magnetic core 1210 using, for example, a thermal epoxy which is not shown in FIG. 13. An optional cover or housing is also not shown in FIG. 13.

Four-phase coil 1300 can operate in four modes. The four modes include the 4-phase mode, the DD mode, the DD@θ mode, and the circular mode. It should be noted that the four-phase coil 1300 creates a rotating magnetic field when in the 4-phase mode. No rotating magnetic field is created by the four-phase coil 1300 when in the other modes, i.e., the DD mode, the DD@θ mode, and the circular mode.

Figure 16:
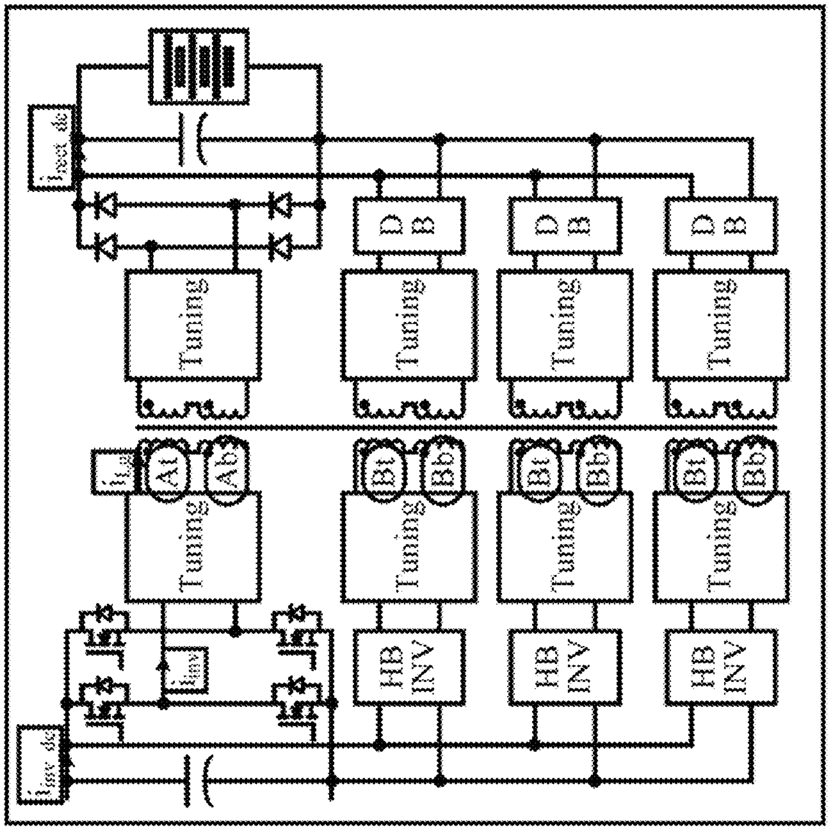
FIGS. 16-17 each provides a circuit diagram of an FPWPT system with a bipolar four-phase coil assembly on both the transmit side and the receive side.
Figure 17:
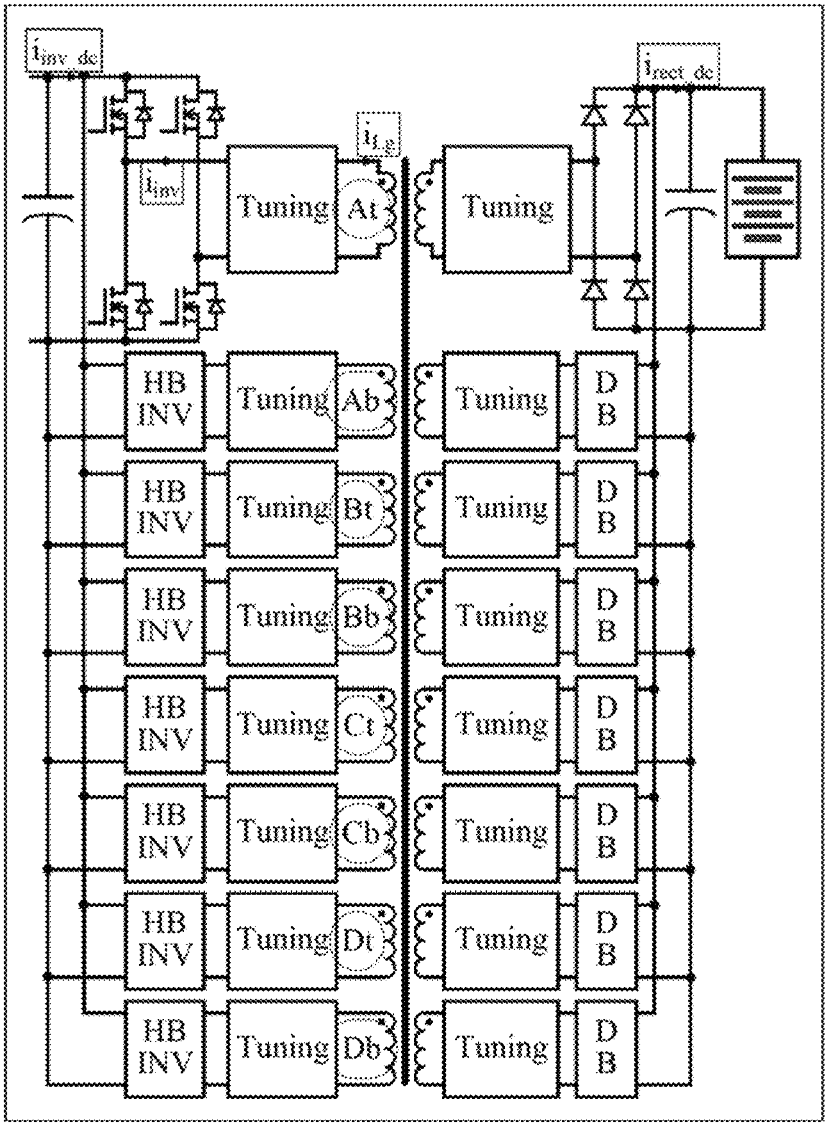
Figure 18:
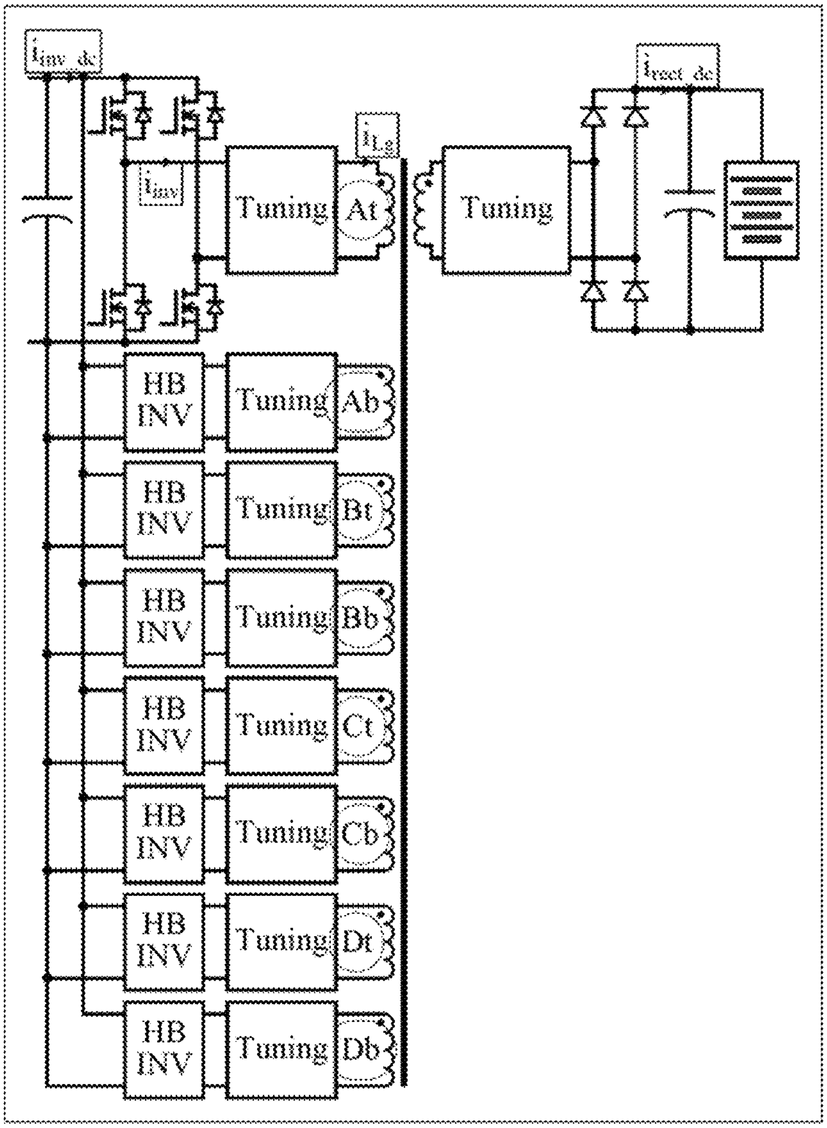
FIGS. 18-19 each provides a circuit diagram of an FPWPT system with a bipolar four-phase coil assembly on one side and a single-phase DD or circular coil on the other side.
Figure 19:
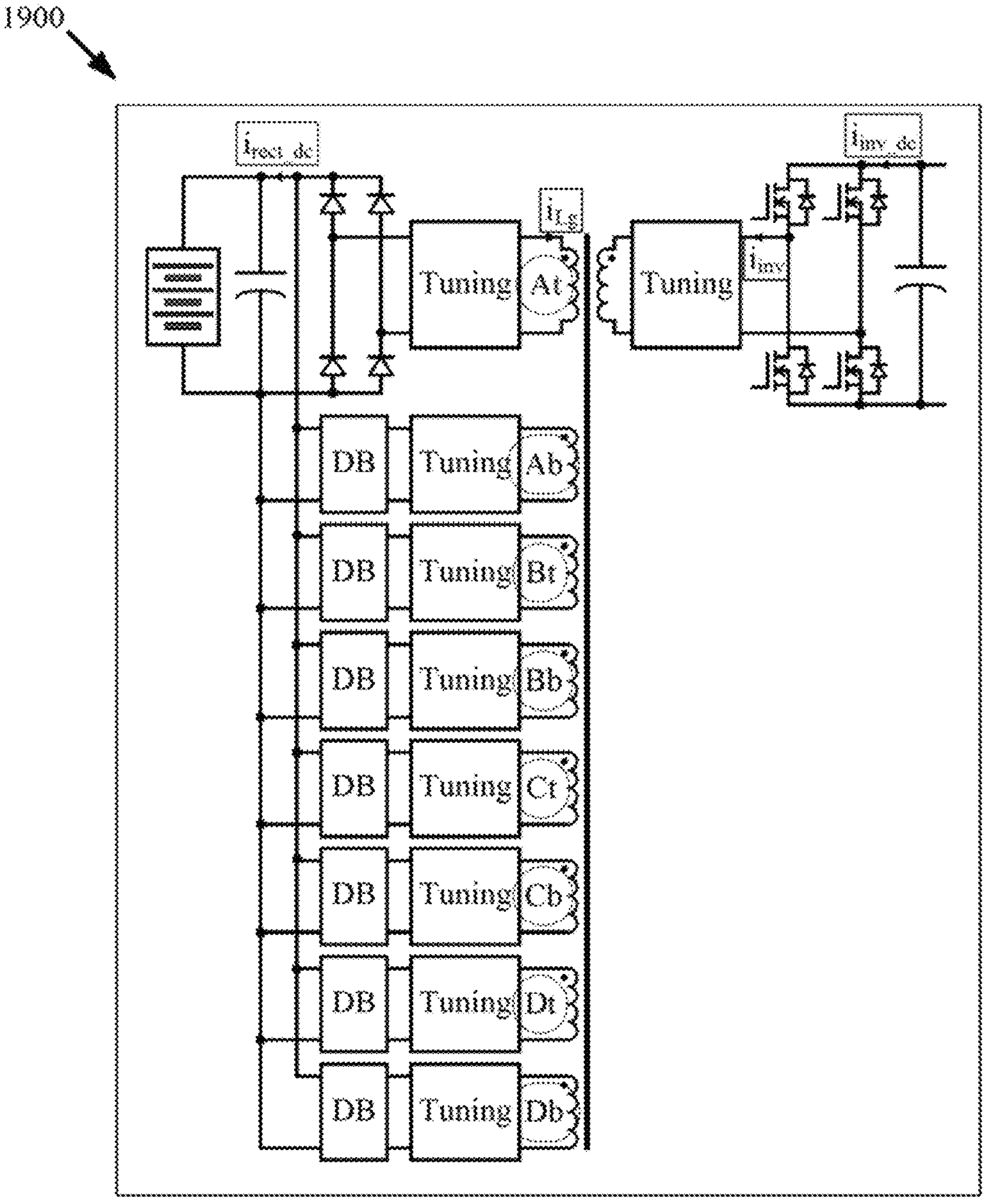
Figure 20A:
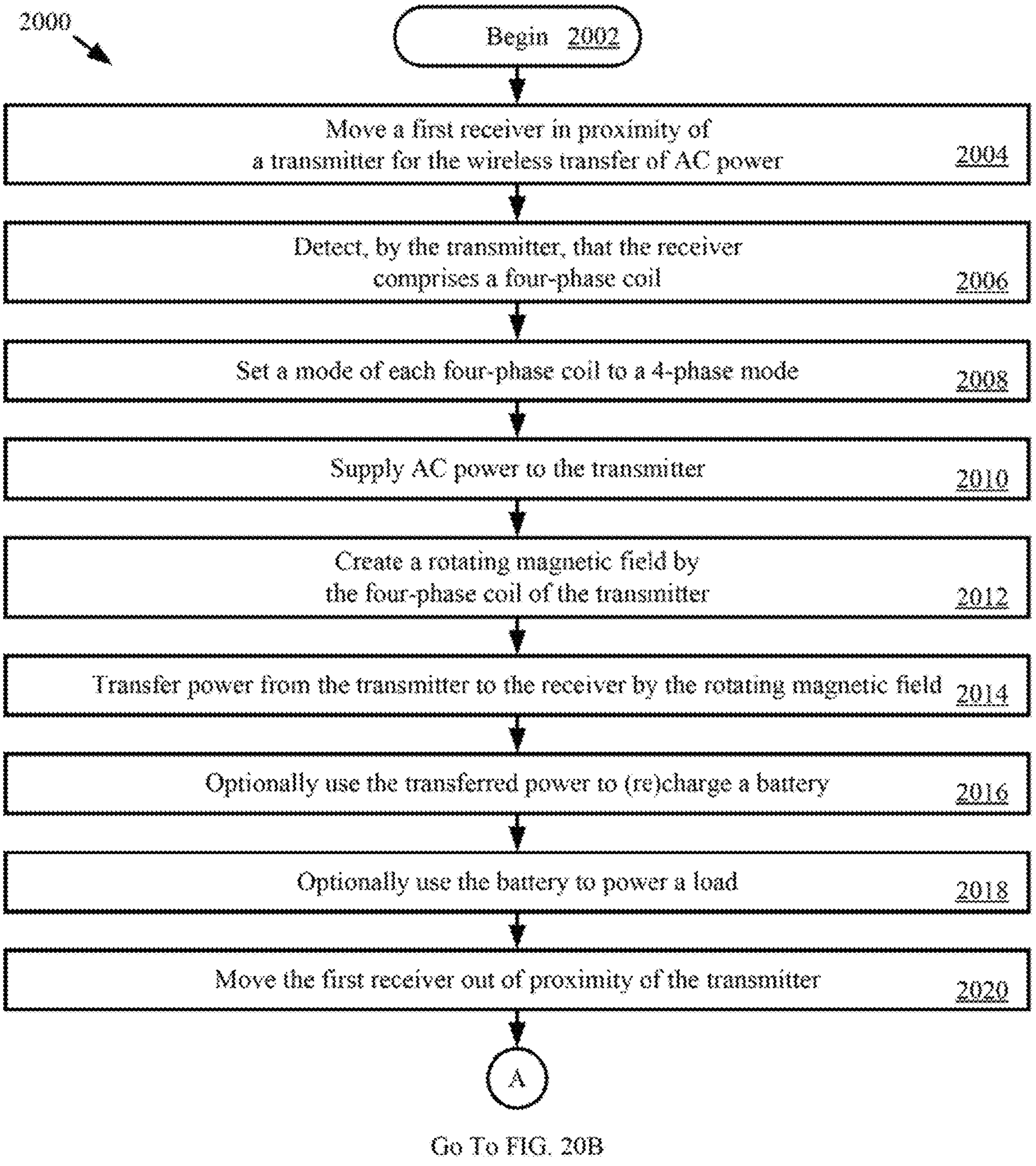
FIGS. 20A-20D (collectively referred to as "FIG. 20") provide a flow diagram of an illustrative method for providing a magnetic field.
Figure 20B:
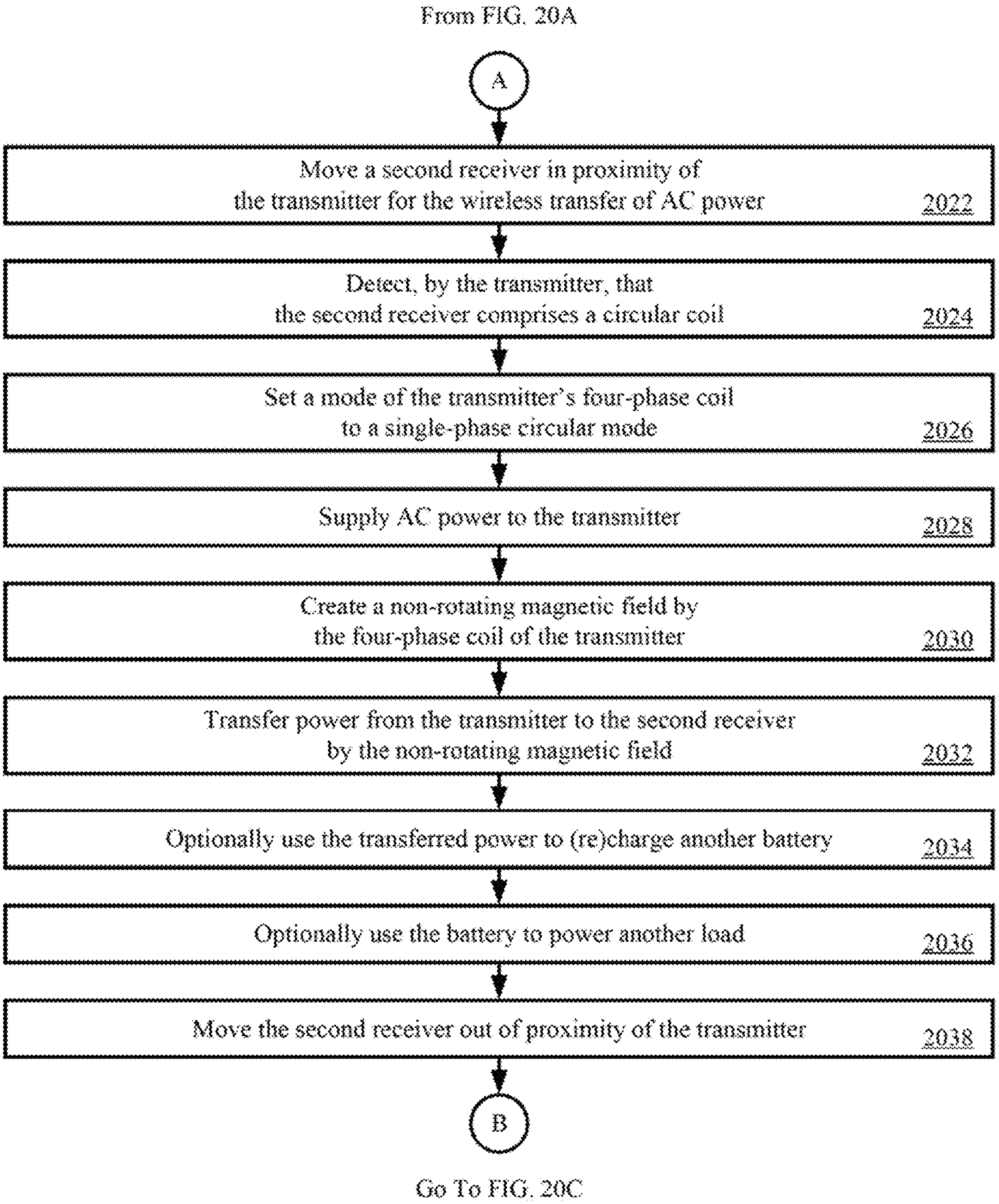
Figure 20C:
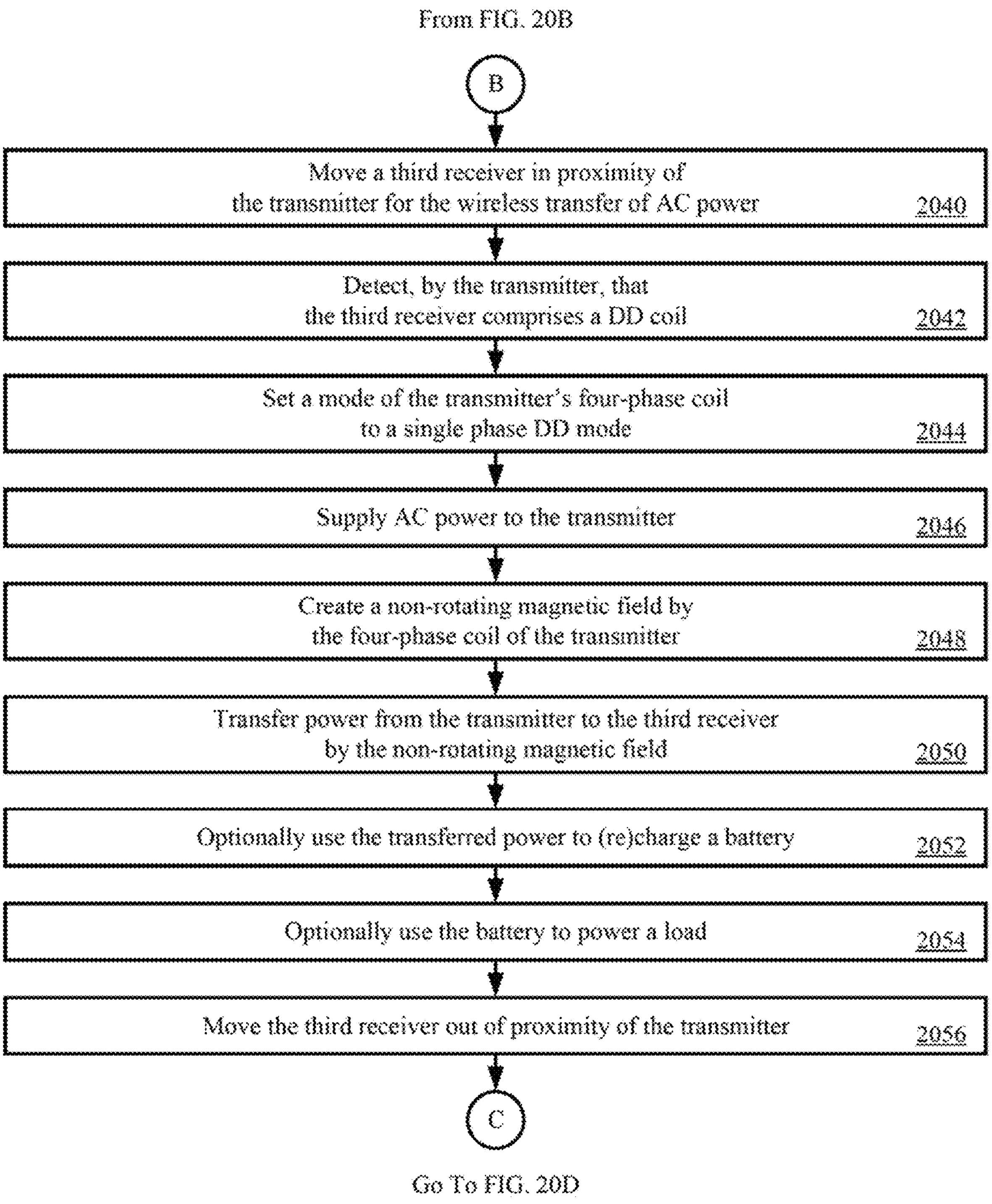
Figure 20D:
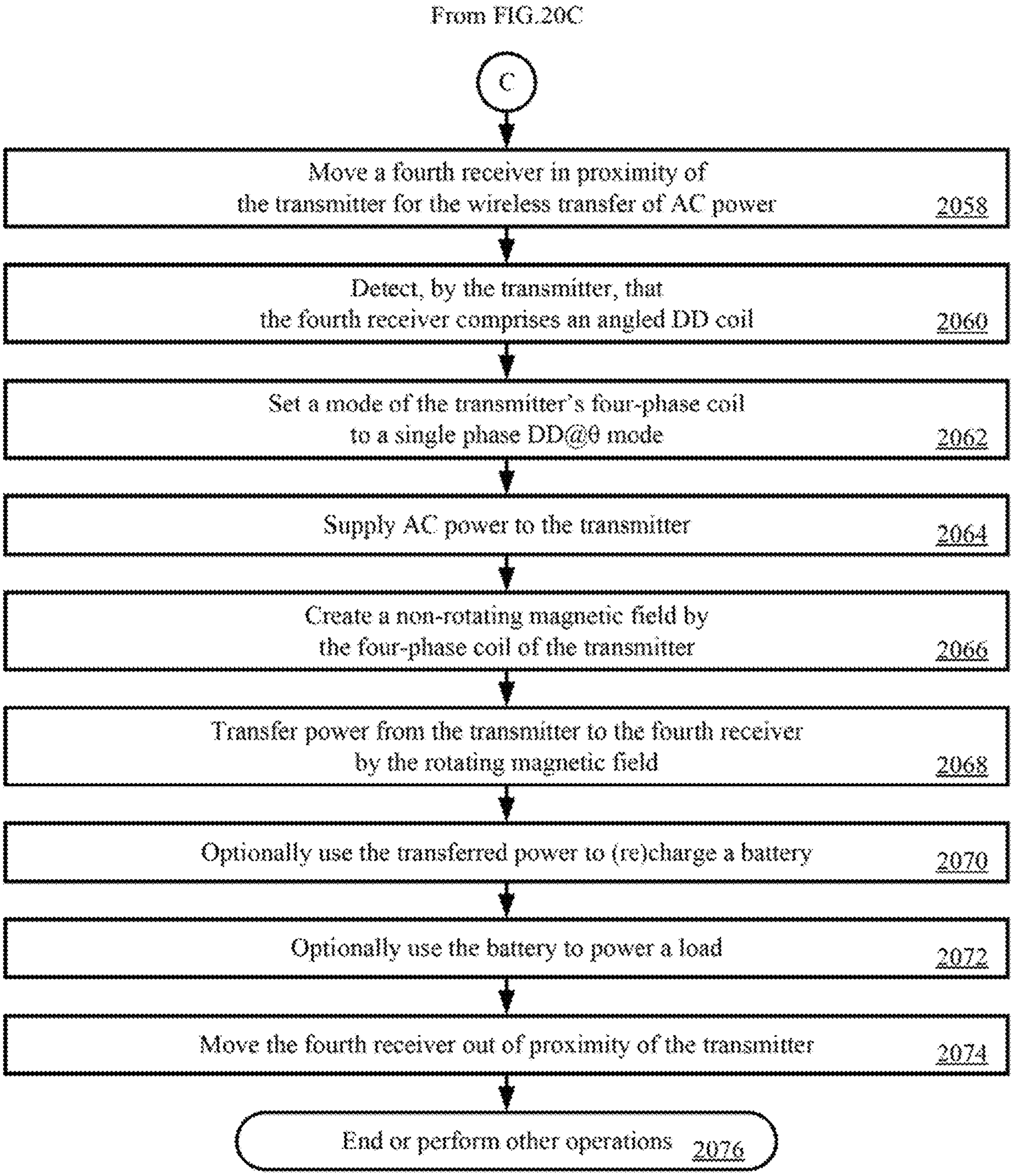

FIGS. 16-17 each provides a circuit diagram 1600, 1700 of a FPWPT system with a bipolar four-phase coil assembly (e.g., including coil 1300 of FIG. 13) on both the transmit side and the receive side. FIGS. 18-19 each provides a circuit diagram 1800, 1900 of a FPWPT system with a bipolar four-phase coil assembly (e.g., including coil 1300 of FIG. 13) on one side and a single-phase DD or circular coil on the other side.

FIG. 20 provides a flow diagram of an illustrative method 2000 for wirelessly transferring power. Method 2000 begins at block 2002 and continues to block 2004 where a first receiver (e.g., receiver 222 of FIG. 2) is moved in proximity to a transmitter (e.g., transmitter 204 of FIG. 2). First receiver may be contained in an electronic device (e.g., electronic device 206 of FIG. 2). The electronic device can include, but is not limited to, a vehicle (e.g., vehicle 102 of FIG. 1). The vehicle may be moved in proximity to the transmitter by driving over a pad (e.g., power transfer device 104 of FIG. 1) disposed on or in the ground (e.g., ground 106 of FIG. 1). The term "proximity", as used here, refers to a distance within the wireless transmission range of the transmitter.

Next in block 2006, the transmitter detects that the receiver comprises a four-phase coil (e.g., four-phase coil 300 of FIG. 3). For example, this detection may be made via a wireless communication between the transmitter and/or receiver. The wireless communication can include a message indicating the type of coil contained in the receiver. The present solution is not limited to the particulars of this example. Other known or to be known techniques for gaining knowledge about the type of receiver coil can be used here.

Based on this detection, a mode of the transmitter's four-phase coil is set to a 4-phase mode in block 2008. The mode of the transmitter's four-phase coil may be set, for example, by controller 280. Similarly, the mode of the receiver's four-phase coil is set to a 4-phase mode in block 2008. This scenario is similar to the scenario shown in FIG. 4A.

In block 2010, AC power is supplied to the transmitter. The AC power may be supplied from a power source (e.g., power source 202 of FIG. 2) electrically connected to the transmitter. Since the transmitter is operating in its 4-phase mode, a rotating magnetic field is created by the four-phase coil in block 2012. Power is transferred in block 2014 from the transmitter to the first receiver by the rotating magnetic field. The transferred power may optionally be used in block 2016 to (re)charge a battery (e.g., battery 240 of FIG. 2). The battery may optionally be used in block 2018 to power a load (e.g., load 240 of FIG. 2. The first receiver may be moved out of proximity of the transmitter, as shown by block 2020. Method 2000 then continues to block 2022 of FIG. 20B.

Block 2022 involves moving a second receiver in proximity to a transmitter (e.g., transmitter 204 of FIG. 2). Second receiver may be contained in another electronic device. The electronic device can include, but is not limited to, another vehicle. The another vehicle may be moved in proximity to the transmitter by driving over the pad (e.g., power transfer device 104 of FIG. 1) disposed on or in the ground (e.g., ground 106 of FIG. 1).

Next in block 2024, the transmitter detects that the second receiver comprises a circular coil (e.g., circular coil 500 of FIG. 5). For example, this detection may be made via a wireless communication between the transmitter and/or second receiver. The wireless communication can include a message indicating the type of coil contained in the second receiver. The present solution is not limited to the particulars of this example. Other known or to be known techniques for gaining knowledge about the type of receiver coil can be used here.

Based on this detection, a mode of the transmitter's four-phase coil is set to a single-phase circular mode in block 2026. This scenario is similar to the scenario shown in FIG. 5.

In block 2028, AC power is supplied to the transmitter. The AC power may be supplied from the power source electrically connected to the transmitter. Since the transmitter is operating in its circular mode, a non-rotating magnetic field is created by the four-phase coil in block 2030. Power is transferred in block 2032 from the transmitter to the second receiver by the non-rotating magnetic field. The transferred power may optionally be used in block 2034 to (re)charge another battery. The another battery may optionally be used in block 2036 to power another load. The second receiver may be moved out of proximity of the transmitter, as shown by block 2038. Method 2000 then continues to block 2040 of FIG. 20C.

Block 2040 involves moving a third receiver in proximity to the transmitter. Third receiver may be contained in another electronic device. The electronic device can include, but is not limited to, another vehicle. The another vehicle may be moved in proximity to the transmitter by driving over the pad disposed on or in the ground.

Next in block 2042, the transmitter detects that the third receiver comprises a DD coil (e.g., DD coil 600 of FIG. 6). For example, this detection may be made via a wireless communication between the transmitter and/or third receiver. The wireless communication can include a message indicating the type of coil contained in the third receiver. The present solution is not limited to the particulars of this example. Other known or to be known techniques for gaining knowledge about the type of receiver coil can be used here.

Based on this detection, a mode of the transmitter's four-phase coil is set to a DD mode in block 2044. This scenario is similar to the scenario shown in FIG. 6.

In block 2046, AC power is supplied to the transmitter. The AC power may be supplied from the power source electrically connected to the transmitter. Since the transmitter is operating in its DD mode, a non-rotating magnetic field is created by the four-phase coil in block 2048. Power is transferred in block 2050 from the transmitter to the third receiver by the non-rotating magnetic field. The transferred power may optionally be used in block 2052 to (re)charge another battery. The another battery may optionally be used in block 2054 to power another load. The third receiver may be moved out of proximity of the transmitter, as shown by block 2056. Method 2000 then continues to block 2058 of FIG. 20D.

Block 2058 involves moving a fourth receiver in proximity to the transmitter. Fourth receiver may be contained in another electronic device. The electronic device can include, but is not limited to, another vehicle. The another vehicle may be moved in proximity to the transmitter by driving over the pad disposed on or in the ground.

Next in block 2060, the transmitter detects that the fourth receiver comprises a DD coil and is parked at an angled position (e.g., angled DD coil 650 of FIG. 6). For example, this detection may be made via a wireless communication between the transmitter and/or fourth receiver. The wireless communication can include a message indicating the type of coil contained in the fourth receiver. The present solution is not limited to the particulars of this example. Other known or to be known techniques for gaining knowledge about the type of receiver coil can be used here.

Based on this detection, a mode of the transmitter's four-phase coil is set to a DD@θ mode in block 2062. This scenario is similar to the scenario shown in FIG. 6B.

In block 2064, AC power is supplied to the transmitter. The AC power may be supplied from the power source electrically connected to the transmitter. Since the transmitter is operating in its DD@θ mode, a non-rotating magnetic field is created by the four-phase coil in block 2066. Power is transferred in block 2068 from the transmitter to the fourth receiver by the non-rotating magnetic field. The transferred power may optionally be used in block 2070 to (re)charge another battery. The another battery may optionally be used in block 2072 to power another load. The fourth receiver may be moved out of proximity of the transmitter, as shown by block 2074. Subsequently, method 2000 continues to block 2076 where it ends or other operations are performed (e.g., return to block 2002).

Figure 21:
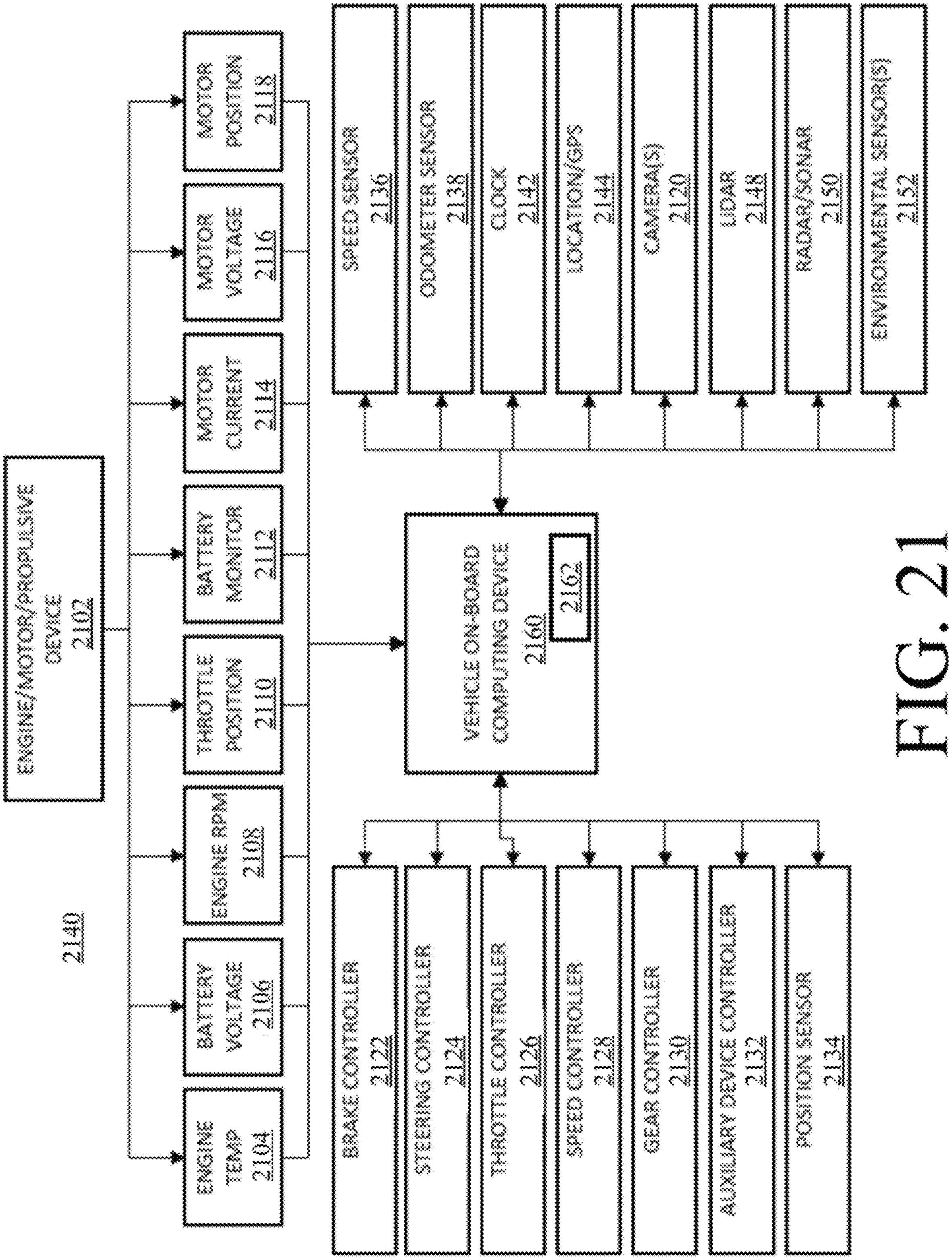
FIG. 21 provides a block diagram of an architecture for the load of FIG. 2.

FIG. 21 shows an illustrative architecture 2100 for a vehicle. Load 240 of FIG. 2 can have the same or similar system architecture as shown in FIG. 21. Thus, the following discussion of architecture 2100 is sufficient for understanding one possible architecture for load 240 of FIG. 2.

Architecture 2100 includes an engine, motor or propulsive device (e.g., a thruster) 2102 and various sensors 2104-2118 for measuring various parameters of the vehicle. Sensors 2104-2118 may include, for example, an engine temperature sensor 2104, a battery voltage sensor 2106, an engine Rotations Per Minute (RPM) sensor 2108, a throttle position sensor 2110, a battery monitoring system 2112 (to measure current, voltage and/or temperature of the battery), motor current sensor 2114, voltage sensor 2116, and/or motor position sensors 2118. Other sensors may also be provided. The other second include, but are not limited to, a position sensor 2134 (e.g., an accelerometer, gyroscope and/or inertial measurement unit), a speed sensor 2136, and/or an odometer sensor 2138. A clock 2142 may be provided that the system uses to determine vehicle time during operation. Clock 2142 may be encoded into the vehicle onboard computing device 2160. It may be a separate device, or multiple clocks may be available.

Various other sensors may be provided that operate to gather information about the environment in which the vehicle is traveling. These sensors may include, but are not limited to, a location sensor 2144 (for example, a Global Positioning System (GPS) device), object detection sensors (e.g., camera(s) 2120), a LiDAR sensor system 2148, and/or a radar and/or a sonar system 2150. The sensors also may include environmental sensors 2152, such as a precipitation sensor and/or ambient temperature sensor. The object detection sensors may enable the vehicle to detect objects that are within a given distance range thereof in any direction, while the environmental sensors 2152 collect data about environmental conditions within the vehicle's area of travel.

During operations, information is communicated from the sensors to an onboard computing device 2160. The onboard computing device 2160 may be configured to analyze the data captured by the sensors and/or data received from data providers, and may be configured to optionally control operations of the vehicle based on the results of the analysis. For example, the onboard computing device 2160 may be configured to control: braking via a brake controller 2122; direction via a steering controller 2124; speed and acceleration via a throttle controller 2126; a motor speed controller 2128; a differential gear controller 2130; and/or other controllers.

Geographic location information may be communicated from the location sensor 2144 to the onboard computing device 2160, which may then access a map of the environment that corresponds to the location information to determine known fixed features of the environment such as streets, buildings, stop signs and/or stop/go signals. Captured images from the cameras 2120 and/or object detection information captured from sensors such as LiDAR 2148 are communicated from those sensors to the onboard computing device 2160. The object detection information and/or captured images are processed by a perception module of the onboard computing device 2160 to detect objects in proximity to the vehicle. Any known or to be known technique for making an object detection based on sensor data and/or captured images may be used in the embodiments disclosed in this document. Onboard computing device 2160 generates and/or updates trajectories for the vehicle based on the object detections made by the perception module 2124.

Figure 22:
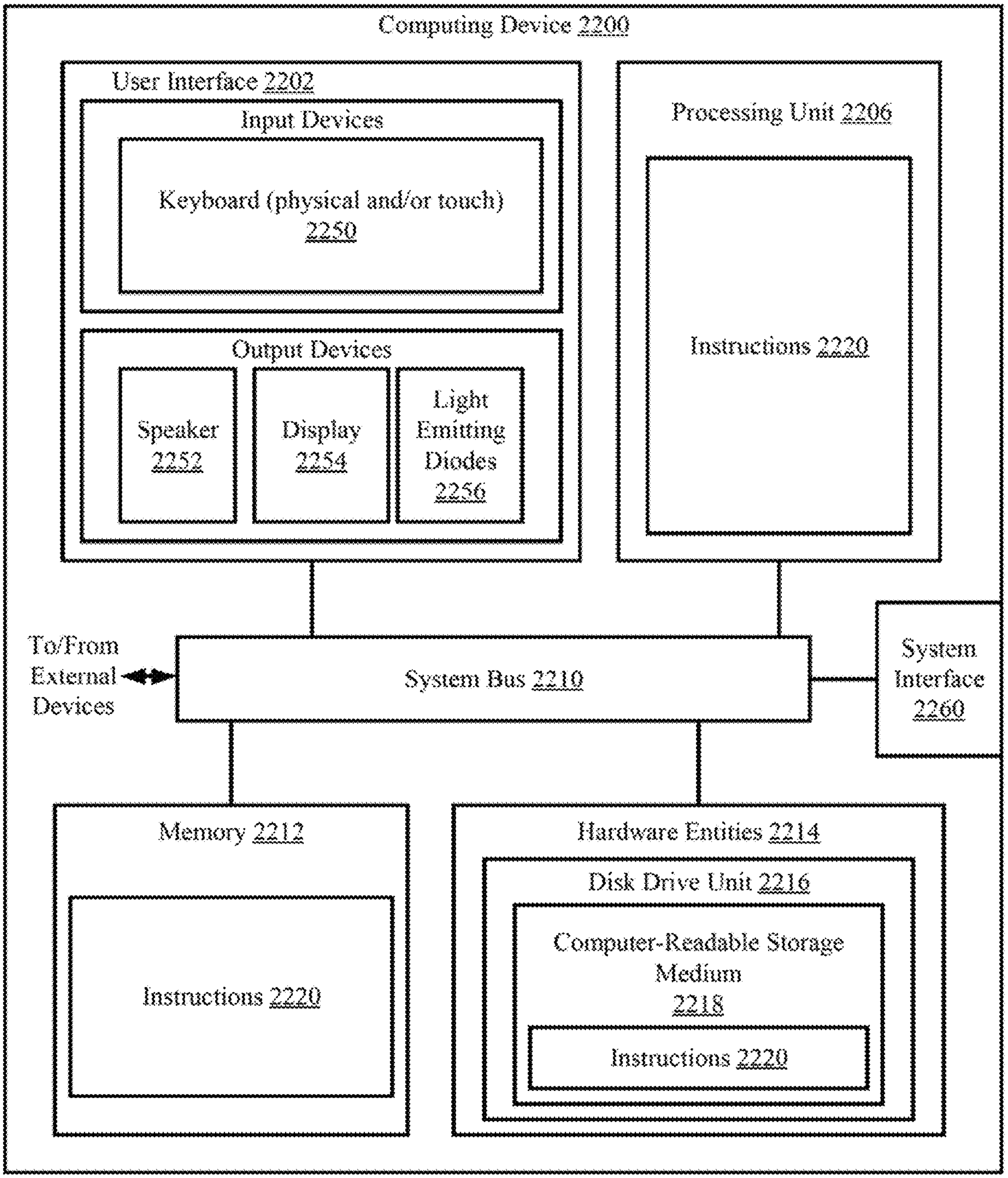
FIG. 22 provides a block diagram of an architecture for a computing device.

Referring now to FIG. 22, there is shown an illustrative architecture for a computing device 2200. Load 240 of FIG. 2, controller 280 of FIG. 2, and/or vehicle on-board computing device 2160 of FIG. 21 is/are the same as or similar to computing device 2200. As such, the discussion of computing device 2200 is sufficient for understanding the components 240, 2160.

Computing device 2200 may include more or less components than those shown in FIG. 22. However, the components shown are sufficient to disclose an illustrative solution implementing the present solution. The hardware architecture of FIG. 22 represents one implementation of a representative computing device configured to receive information, process the receive information, transmit information and/or control operations of one or more robots, as described herein. As such, the computing device 2200 of FIG. 22 implements at least a portion of the method(s) described herein.

Some or all components of the computing device 2200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or controllers (e.g., controllers comprising microprocessors). The passive and/or active components can be adapted to, arranged to and/or programmed to perform one or more of the methodologies, procedures, or functions described herein.

As shown in FIG. 22, the computing device 2200 comprises a user interface 2202, a central processing unit (CPU) 2206, a system bus 2210, a memory 2212 connected to and accessible by other portions of computing device 2200 through system bus 2210, a system interface 2260, and hardware entities 2214 connected to system bus 2210. The user interface can include input devices and output devices, which facilitate user-software interactions for controlling operations of the computing device 2200. The input devices include, but are not limited to, a physical and/or touch keyboard 2250. The input devices can be connected to the computing device 2200 via a wired or wireless connection (e.g., a Bluetooth® connection). The output devices include, but are not limited to, a speaker 2252, a display 2254, and/or light emitting diodes 2256. System interface 2260 is configured to facilitate wired or wireless communications to and from external devices (e.g., network nodes such as access points, etc.).

At least some of the hardware entities 2214 perform actions involving access to and use of memory 2212, which can be a Random Access Memory (RAM), a disk drive, flash memory, a universal serial bus (USB) drive and/or another hardware device that is capable of storing instructions and data. Hardware entities 2214 can include a disk drive unit 2216 comprising a computer-readable storage medium 2218 on which is stored one or more sets of instructions 2220 (e.g., software code) configured to implement one or more of the methodologies, procedures, or functions described herein. The instructions 2220 can also reside, completely or at least partially, within the memory 2212 and/or within the CPU 2206 during execution thereof by the computing device 2200. The memory 2212 and the CPU 2206 also can constitute machine-readable media. The term "machine-readable media", as used here, refers to a single medium or multiple media (e.g., a centralized or distributed database, and/or associated caches and servers) that store the one or more sets of instructions 2220. The term "machine-readable media", as used here, also refers to any medium that is capable of storing, encoding or carrying a set of instructions 2220 for execution by the computing device 2200 and that cause the computing device 2200 to perform any one or more of the methodologies of the present disclosure.

Without excluding further possible embodiments, certain example embodiments are summarized in the following clauses.

Clause 1: A method for providing a magnetic field, comprising: supplying AC power to a four-phase coil assembly (e.g., coil assembly 300 of FIG. 3 or 1300 of FIG. 13) operable in a plurality of different operational modes; creating a rotating magnetic field by the four-phase coil assembly when operating in a first mode of the plurality of different operational modes; and creating a non-rotating magnetic field by the four-phase coil assembly when operating in a second mode of the plurality of different operational modes. The four-phase coil assembly has a non-circular shape and comprises at least one first layer of four coils (e.g., coils 302, 304, 306, 308 of FIG. 3 or coils 1302, 1304, 1306, 1308, 1312, 1314, 1316, 1318 of FIG. 13) disposed on a magnetic core (e.g., core 310 of FIG. 3 or core 1310 of FIG. 13) so as to be arranged symmetrically around a center (e.g., center 314 of FIG. 3) of the four-phase coil assembly. Each of the four coils is associated with a respective one of four phases (e.g., phases A, B, C, D). In other scenarios, the coils are disposed on the magnetic core so as to be arranged asymmetrically around the center of the four-phase coil assembly.

Clause 2: The method according to clause 1, wherein each of the four coils has a square perimeter shape or a rectangular perimeter shape.

Clause 3: The method according to any of the preceding method clauses, wherein the four-phase coil assembly comprises a second layer of four coils, the coils of the first layer (e.g., coils 1302, 1304, 1306, 1308 of FIG. 13) have a same polarity while the coils of the second layer e.g., coils 1312, 1314, 1316, 1318 of FIG. 13) have an opposite polarity.

Clause 4: The method according to any of the preceding method clauses, wherein the plurality of operational modes comprises at least two of a 4-phase mode, a single-phase DD mode, and a single-phase circular mode.

Clause 5: The method according to any of the preceding method clauses, further comprising transitioning a mode of the four-phase coil assembly into the 4-phase mode when a receiver (e.g., receiver 222 of FIG. 2) comprises another four-phase coil assembly (e.g., coil assembly 300 of FIG. 3 or 1300 of FIG. 13). The rotating magnetic field is created when the four-phase coil assembly operates in the 4-phase mode in which (i) AC current flows in the same direction in the 4-phase unipolar coils(e.g., coils 302, 304 of FIG. 3 or 1302, 1304, 1312, 1314 of FIG. 13), (ii) AC current flows in one direction in the top coils but the opposite direction in bottom cols in bipolar coils (e.g., coils 306, 308 of FIG. 3 or 1306, 1308, 1316, 1318 of FIG. 13), and (iii) there is a 90° phase shift in the AC current between each adjacent coil pair.

Clause 6: The method according to any of the preceding method clauses, further comprising transitioning a mode of the four-phase coil assembly into the single-phase circular mode when a receiver (e.g., receiver 222 of FIG. 2) comprises a circular coil (e.g., circular coil 500 of FIG. 5 or 1400 of FIG. 14). The non-rotating magnetic field is created when the four-phase coil assembly operates in the single-phase circular mode in which AC current flows in a same direction through the four coils (e.g., coils 302, 304, 306, 308 of FIG. 3) or the eight coils (e.g., coils 1302, 1304, 1306, 1308, 1312, 1314, 1316, 1318 of FIG. 13).

Clause 7: The method according to any of the preceding method clauses, further comprising transitioning a mode of the four-phase coil assembly into the single-phase DD mode when a receiver (e.g., receiver 222 of FIG. 2) comprises a DD coil (e.g., DD coil 600 of FIG. 6 or 1500 of FIG. 15). The non-rotating magnetic field is created when the four-phase coil assembly operates in the single-phase DD mode in which (i) AC current flows in a first direction through first and second ones of the four coils in the unipolar case (e.g., coils 302, 304 of FIG. 3) or a first set of four of the eight coils in the bipolar case (e.g., coils 1302, 1304, 1312, 1314 of FIG. 13) and (ii) AC current flows in an opposite second direction through third and fourth ones of the coils in the unipolar case (e.g., coils 306, 308 of FIG. 3) or a second set of four of the eight coils in the bipolar case (e.g., coils 1306, 1308, 1316, 1318 of FIG. 13).

Clause 8: The method according to any of the preceding method clauses, wherein the four-phase coil assembly and another coil assembly collectively comprise a wireless power transfer system (e.g., WPT system 260 of FIG. 2).

Clause 9: The method according to any of the preceding method clauses, further comprising transferring power from the four-phase coil assembly to the another coil assembly by selectively using the rotating magnetic field or the non-rotating magnetic field.

Clause 10: The method according to any of the preceding method clauses, further comprising using the transferred power to (re)charge a battery (e.g., battery 240 of FIG. 2) of an electronic device (e.g., electronic device 206 of FIG. 2).

Clause 11: A system (e.g., system 100 of FIG. 1 or 200 of FIG. 2), comprising: a power source (e.g., power source 202 of FIG. 2) configured to supply alternating current; and a four-phase coil assembly (e.g., coil assembly 300 of FIG. 3 or 1300 of FIG. 13) having a shape and comprising at least one first layer of four coils (e.g., coils 302, 304, 306, 308 of FIG. 3 or coils 1302, 1304, 1306, 1308, 1312, 1314, 1316, 1318 of FIG. 13) disposed on a magnetic core (e.g., core 310 of FIG. 3 or core 1310 of FIG. 13) so as to be arranged symmetrically around a center (e.g., center 314 of FIG. 3) of the four-phase coil assembly (each of the four coils being associated with a respective one of four phases (e.g., phases A, B, C, D)). The shape of the four-phase coil assembly may be non-circular in some scenarios. The four-phase coil assembly is configured to be operable in a plurality of different operational modes. A rotating magnetic field is created by the four-phase coil assembly when the alternating current is supplied thereto from the power source and the four-phase coil assembly is operating in a first mode of the plurality of different operational modes. A non-rotating magnetic field is created by the four-phase coil assembly when the alternating current is supplied thereto from the power source and the four-phase coil assembly is operating in a second mode of the plurality of different operational modes.

Clause 12: The system according to clause 11, wherein each of the four coils has a generally square perimeter shape or a generally rectangular perimeter shape. The corners of each coil may be rounded. The coils may alternatively be circular, hexagon, or any polygon shape.

Clause 13: The system according to any of the preceding system clauses, wherein the four-phase coil assembly comprises a second layer of four coils, the coils of the first layer (e.g., coils 1302, 1304, 1306, 1308 of FIG. 13) have a same polarity while the coils of the second layer (e.g., coils 1312, 1314, 1316, 1318 of FIG. 13) have an opposite polarity.

Clause 14: The system according to any of the preceding system clauses, wherein the plurality of operational modes comprises at least two of a 4-phase mode, a single-phase DD mode, and a single-phase circular mode.

Clause 15: The system according to any of the preceding system clauses, further comprising a controller (e.g., controller 280 of FIG. 2, vehicle on-board computing device 2160 of FIG. 21, and/or computing device 2200 of FIG. 22) for transitioning a mode of the four-phase coil assembly into the 4-phase mode when a receiver (e.g., receiver 222 of FIG. 2) comprises another four-phase coil assembly (e.g., coil assembly 300 of FIG. 3 or 1300 of FIG. 13). The rotating magnetic field is created when the four-phase coil assembly operates in the 4-phase mode in which (i) AC current flows in the same direction in the 4-phase unipolar coils (e.g., coils 302, 304 of FIG. 3 or 1302, 1304, 1312, 1314 of FIG. 13), (ii) AC current flows in one direction in the top coils but the opposite direction in bottom cols in bipolar coils (e.g., coils 306, 308 of FIG. 3 or 1306, 1308, 1316, 1318 of FIG. 13), and (iii) there is a 90° phase shift in the AC current between each adjacent coil pair.

Clause 16: The system according to any of the preceding system clauses, further comprising a controller (e.g., controller 280 of FIG. 2, vehicle on-board computing device 2160 of FIG. 21, and/or computing device 2200 of FIG. 22) configured to transition a mode of the four-phase coil assembly into the single-phase circular mode when a receiver (e.g., receiver 222 of FIG. 2) comprises a circular coil (e.g., circular coil 500 of FIG. 5 or 1400 of FIG. 14). The non-rotating magnetic field is created when the four-phase coil assembly operates in the single-phase circular mode in which AC current flows in a same direction through the four coils.

Clause 17: The system according to any of the preceding system clauses, further comprising a controller (e.g., controller 280 of FIG. 2, vehicle on-board computing device 2160 of FIG. 21, and/or computing device 2200 of FIG. 22) transitioning a mode of the four-phase coil assembly into the single-phase DD mode when a receiver (e.g., receiver 222 of FIG. 2) comprises a DD coil (e.g., DD coil 600 of FIG. 6 or 1500 of FIG. 15). The non-rotating magnetic field is created when the four-phase coil assembly operates in the single-phase DD mode in which (i) AC current flows in a first direction through first and second ones of the four coils in the unipolar case or a first set of four coils in the bipolar case and (ii) AC current flows in an opposite second direction through third and fourth ones of the coils in the unipolar case or a second set of four coils in the bipolar case.

Clause 18: The system according to any of the preceding system clauses, wherein the four-phase coil assembly and another coil assembly collectively comprise a wireless power transfer system (e.g., WPT system 260 of FIG. 2).

Clause 19: The system according to any of the preceding system clauses, wherein power is transferred from the four-phase coil assembly to the another coil assembly by selectively using the rotating magnetic field or the non-rotating magnetic field.

Clause 20: The system according to any of the preceding system clauses, wherein the transferred power is used to (re)charge a battery (e.g., battery 240 of FIG. 2) of an electronic device (e.g., electronic device 206 of FIG. 2).

The terms “processor” and “processing device” refer to a hardware component of an electronic device that is configured to execute programming instructions. Except where specifically stated otherwise, the singular terms “processor” and “processing device” are intended to include both single-processing device embodiments and embodiments in which multiple processing devices together or collectively perform a process.

The terms “memory,” “memory device,” “computer-readable medium,” “data store,” “data storage facility” and the like each refer to a non-transitory device on which computer-readable data, programming instructions or both are stored. Except where specifically stated otherwise, the terms “memory,” “memory device,” “computer-readable medium,” “data store,” “data storage facility” and the like are intended to include single device embodiments, embodiments in which multiple memory devices together or collectively store a set of data or instructions, as well as individual sectors within such devices. A computer program product is a memory device with programming instructions stored on it.

As used in this document, the singular form “a”, “an”, and “the” include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

What is claimed is:

1. A method for providing a magnetic field, comprising:

supplying AC power to a four-phase coil assembly operable in a plurality of different operational modes;

creating a rotating magnetic field by the four-phase coil assembly when operating in a first mode of the plurality of different operational modes; and creating a non-rotating magnetic field by the four-phase coil assembly when operating in a second mode of the plurality of different operational modes;

wherein the four-phase coil assembly has a shape and comprises at least one first layer of four coils disposed on a magnetic core so as to be arranged symmetrically around a center of the four-phase coil assembly; and wherein each of the four coils is associated with a respective one of four phases.

2. The method according to claim 1, wherein each of the four coils has a generally square perimeter shape or a generally rectangular perimeter shape.

3. The method according to claim 1, wherein the four-phase coil assembly comprises a second layer of four coils, the coils of the first layer have a same polarity while the coils of the second layer have an opposite polarity.

4. The method according to claim 1, wherein the plurality of operational modes comprises at least two of a 4-phase mode, a single-phase DD mode, and a single-phase circular mode.

5. The method according to claim 4, further comprising:

transitioning a mode of the four-phase coil assembly into the 4-phase mode when a receiver comprises another four-phase coil assembly;

wherein the rotating magnetic field is created when the four-phase coil assembly operates in the 4-phase mode in which (i) AC current flows in a same direction through the four coils, and (ii) there is a 90° phase shift in the AC current between each adjacent coil pair.

6. The method according to claim 4, further comprising:

transitioning a mode of the four-phase coil assembly into the single-phase circular mode when a receiver comprises a circular coil;

wherein the non-rotating magnetic field is created when the four-phase coil assembly operates in the single-phase circular mode in which AC current flows in a same direction through the four coils and there are no phase shifts between the currents.

7. The method according to claim 4, further comprising:

transitioning a mode of the four-phase coil assembly into the single-phase DD mode when a receiver comprises a DD coil;

wherein the non-rotating magnetic field is created when the four-phase coil assembly operates in the single-phase DD mode in which (i) AC current flows in a first direction through first and second ones of the four coils and (ii) AC current flows in an opposite second direction through third and fourth ones of the coils.

8. The method according to claim 1, wherein the four-phase coil assembly and another coil assembly collectively comprise a wireless power transfer system.

9. The method according to claim 8, further comprising transferring power from the four-phase coil assembly to the another coil assembly by selectively using the rotating magnetic field or the non-rotating magnetic field.

10. The method according to claim 9, further comprising using the transferred power to (re)charge a battery of an electronic device.

11. A system, comprising:

a power source configured to supply alternating current;

a four-phase coil assembly having a shape and comprising at least one first layer of four coils disposed on a magnetic core so as to be arranged symmetrically around a center of the four-phase coil assembly, each of the four coils being associated with a respective one of four phases;

wherein the four-phase coil assembly is configured to be operable in a plurality of different operational modes;

wherein a rotating magnetic field is created by the four-phase coil assembly when the alternating current is supplied thereto from the power source and the four-phase coil assembly is operating in a first mode of the plurality of different operational modes; and wherein a non-rotating magnetic field is created by the four-phase coil assembly when the alternating current is supplied thereto from the power source and the four-phase coil assembly is operating in a second mode of the plurality of different operational modes.

12. The system according to claim 11, wherein each of the four coils has a generally square perimeter shape or a generally rectangular perimeter shape.

13. The system according to claim 11, wherein the four-phase coil assembly comprises a second layer of four coils, the coils of the first layer have a same polarity while the coils of the second layer have an opposite polarity.

14. The system according to claim 11, wherein the plurality of operational modes comprises at least two of a 4-phase mode, a single-phase DD mode, and a single-phase circular mode.

15. The system according to claim 14, further comprising:

a controller for transitioning a mode of the four-phase coil assembly into the 4-phase mode when a receiver comprises another four-phase coil assembly;

wherein the rotating magnetic field is created when the four-phase coil assembly operates in the 4-phase mode in which (i) AC current flows in a same direction through first and second ones of the four coils, and (ii) there is a 90° phase shift in the AC current between each adjacent coil pair.

16. The system according to claim 14, further comprising:

a controller configured to transition a mode of the four-phase coil assembly into the single-phase circular mode when a receiver comprises a circular coil;

wherein the non-rotating magnetic field is created when the four-phase coil assembly operates in the single-phase circular mode in which AC current flows in a same direction through the four coils and there are no phase shift between the currents.

17. The system according to claim 14, further comprising:

a controller transitioning a mode of the four-phase coil assembly into the single-phase DD mode when a receiver comprises a DD coil;

wherein the non-rotating magnetic field is created when the four-phase coil assembly operates in the single-phase DD mode in which (i) AC current flows in a first direction through first and second ones of the four coils and (ii) AC current flows in an opposite second direction through third and fourth ones of the coils.

18. The system according to claim 11, wherein the four-phase coil assembly and another coil assembly collectively comprise a wireless power transfer system.

19. The system according to claim 18, wherein power is transferred from the four-phase coil assembly to the another coil assembly by selectively using the rotating magnetic field or the non-rotating magnetic field.

20. The system according to claim 19, wherein the transferred power is used to (re)charge a battery of an electronic device.

* * * * *